US007831542B2

(12) United States Patent
Milov

(10) Patent No.: US 7,831,542 B2

(45) Date of Patent: Nov. 9, 2010

(54) ITERATIVE SEARCH WITH DATA ACCUMULATION IN A COGNITIVE CONTROL FRAMEWORK

(75) Inventor: Denis Sergeevich Milov, Kirishi (RU)

(73) Assignee: Intel Corporation, Santa Clara, CA (US)

( * ) Notice: Subject to any disclaimer, the term of this patent is extended or adjusted under 35 U.S.C. 154(b) by 1175 days.

(21) Appl. No.: 10/583,650

(22) PCT Filed: Nov. 11, 2005

(86) PCT No.: PCT/RU2005/000557

§ 371 (c)(1), (2), (4) Date: Jun. 20, 2006

(87) PCT Pub. No.: WO2007/055610

PCT Pub. Date: May 18, 2007

(65) Prior Publication Data

US 2009/0271386 A1 Oct. 29, 2009

(51) Int. Cl.
*G06F 7/00* (2006.01)

(52) U.S. Cl. .................................................. 707/602

(58) Field of Classification Search .................... 707/3, 707/602

See application file for complete search history.

(56) References Cited

U.S. PATENT DOCUMENTS

| | | | | |
|---|---|---|---|---|
| 2004/0078758 | A1 * | 4/2004 | Kuth | 715/513 |
| 2006/0064477 | A1 * | 3/2006 | Renkis | 709/223 |
| 2006/0203107 | A1 * | 9/2006 | Steinberg et al. | 348/239 |

* cited by examiner

*Primary Examiner*—Charles Rones
*Assistant Examiner*—Fazlul Quader
(74) *Attorney, Agent, or Firm*—Steven P. Skabrat

(57) ABSTRACT

Searching hypotheses for locations of objects in a playback image corresponding to a recorded image generated by a graphical user interface (GUI) of an application program may be accomplished by capturing the playback image, detecting at least one active object in the recorded image, searching subsets of hypotheses from the playback image for an object according to predetermined criteria, recalculating old actions for the object in the playback image by applying actions according to an execution scenario and loading a next set of data, when the object is found, and checking dynamic conditions.

25 Claims, 20 Drawing Sheets

COGNITIVE CONTROL FRAMEWORK (CCF) 102
RECORDING COMPONENT
REGISTER AND CAPTURE USER ACTIVITY 106
CAPTURE DISPLAY DATA 108
ANALYZE DISPLAY DATA AND USER ACTIVITY AND SAVE DATA 110
EXECUTION SCENARIO 112
PLAYBACK COMPONENT 104
GENERATE SIMULATED USER ACTIVITY 114
PERFORM IMAGE ANALYSIS ON PLAYBACK DISPLAY DATA AND RECORDED DISPLAY DATA 116
CHECK RECORDED TIME CONDITIONS 118
CONTROL EXECUTION OF APPLICATION PROGRAM BASED ON IMAGE ANALYSIS
100
REPORT 120

Select

C

C++

Simple

Tuning Activity

Call Graph Wizard

Sampling Wizard

FIG. 6

| Selection Summary | |
|---|---|
| Events △ | Total |
| Clockticks %(808) | 6.88 |
| Clockticks events(808) | 39.000... |
| Clockticks samples(808) | 26.00 |
| Cycles per Retired Instruction - CPI(808) | 0.57 |
| Instructions Retired %(808) | 19.83 |
| Instructions Retired events(808) | 69.000... |
| Instructions Retired samples(808) | 46.00 |

FIG. 15

| Selection Summary | |
|---|---|
| Events | Total △ |
| Cycles per Retired Instruction - CPI(808) | 0.57 |
| Clockticks %(808) | 6.88 |
| Instructions Retired %(808) | 19.83 |
| Clockticks samples(808) | 26.00 |
| Instructions Retired samples(808) | 46.00 |
| Clockticks events(808) | 39.000... |
| Instructions Retired events(808) | 69.000... |

FIG. 16

Selection Summary

| Events △ | Total |
|---|---|
| Clockticks %(808) | 6.88 |
| Clockticks events(808) | 39.000... |
| Clockticks samples(808) | 26.00 |
| Cycles per Retired Instruction - CPI(808) | 0.57 |
| Instructions Retired %(808) | 19.83 |
| Instructions Retired events(808) | 69.000... |
| Instructions Retired samples(808) | 46.00 |

| Selection Summary | |
|---|---|
| Events | Total △ |
| Cycles per Retired Instruction - CPI(808) | 0.57 |
| Clockticks %(808) | 6.88 |
| Instructions Retired %(808) | 19.83 |
| Clockticks samples(808) | 26.00 |
| Instructions Retired samples(808) | 46.00 |
| Clockticks events(808) | 39.000... |
| Instructions Retired events(808) | 69.000... |

FIG. 23

| Selection Summary | |
|---|---|
| Events | Total |
| Instructions Retired samples(810) | 9.00 |
| Clockticks samples(810) | 7.00 |
| Instructions Retired events(810) | 13.500... |
| Instructions Retired %(810) | 13.85 |
| Clockticks events(810) | 10.500... |
| Clockticks %(810) | 6.31 |
| Cycles per Retired Instruction - CPI(810) | 0.78 |

FIG. 24

ITERATIVE SEARCH WITH DATA ACCUMULATION IN A COGNITIVE CONTROL FRAMEWORK

CROSS-REFERENCE TO RELATED APPLICATION

This application is a National Phase application of, and claims priority to, International Application No. PCT/RU2005/000557, filed Nov. 11, 2005, entitled ITERATIVE SEARCH WITH DATA ACCUMULATION IN A COGNITIVE CONTROL FRAMEWORK

BACKGROUND

1. Field

The present invention relates generally to automatic control of software application programs and image analysis and, more specifically, to analyzing graphical user interface (GUI) images displayed by an application program for automatic control of subsequent execution of the application program.

2. Description

Typical application program analysis systems capture keyboard input data and mouse input data entered by a user. The captured input data may then be used to replay the application program. These systems rely on playback of the application program on the same computer system used to capture the input data, and thus are not portable.

Some existing application program analysis systems use image recognition techniques that are dependent on screen resolution and/or drawing schemes, or have strong dependencies to the underlying operating system (OS) being used. Such systems typically rely on dependencies such as Windows32 or X-Windows application programming interfaces (APIs). This limits their portability and usefulness.

Hence, better techniques for analyzing the GUIs of application programs are desired.

BRIEF DESCRIPTION OF THE DRAWINGS

The features and advantages of the present invention will become apparent from the following detailed description of the present invention in which:

FIG. 6 is an example image illustrating objects of activity of the recording phase according to an embodiment of the present invention;

FIG. 15 is an example image illustrating a table in a recorded image according to an embodiment of the present invention;

FIG. 16 is an example image illustrating another table in a playback image according to an embodiment of the present invention;

FIG. 23 is an example image illustrating another table in a correct playback image according to an embodiment of the present invention;

FIG. 24 is an example image illustrating another table in an incorrect playback image according to an embodiment of the present invention;

DETAILED DESCRIPTION

Embodiments of the present invention comprise a cognitive control framework (CCF) for automatic control of software application programs that have a graphical user interface (GUI). Examples of such applications programs may be executed on current operating systems such as Microsoft Windows® and Linux, for example, as well as other operating systems. An embodiment of the present invention creates a system simulating a human user interacting with the GUI of the application program and using the GUI for automatic control of the application program without relying on dependencies such as specific graphical libraries, windowing systems, or visual controls interfaces or implementations. The CCF comprises an easy-to-use cross-platform tool useful for GUI testing based on pattern recognition. By being independent of any OS-specific controls and graphical libraries, the CCF may be used for interaction with non-standard graphical interfaces as well as with well known ones. The system provides for recording any kind of keyboard and mouse actions the user performs while working with the GUI of the application program and then providing playback of the recorded scenario. In the present invention, image analysis of captured display data (such as screen shots, for example) is performed to identify actions of the application program corresponding to user input data. These actions and input data may be stored for use in future playback of the same user scenario for automatically interacting with the application program.

Embodiments of the present invention comprise operating on two phases: a recording phase and a playback phase. During the recording phase, the system is "learning" how to control the application program. The system registers and captures input actions supplied by the user (such as a mouse click or entering of text via a keyboard, for example) and display data (e.g. screen shots) of images displayed by the application program in response to those actions. The user actions, the time interval between actions, resulting display data of the GUI of the application program, and possibly other data and/or commands form an execution scenario. By following the execution scenario, during the playback phase the system provides the same but fully automatic execution of the application program (simulating the user control but without the real presence of the user). Automatic execution is made possible due to a plurality of image analysis and structural techniques applied correspondingly to images during the recording and playback phases.

Figure 1:
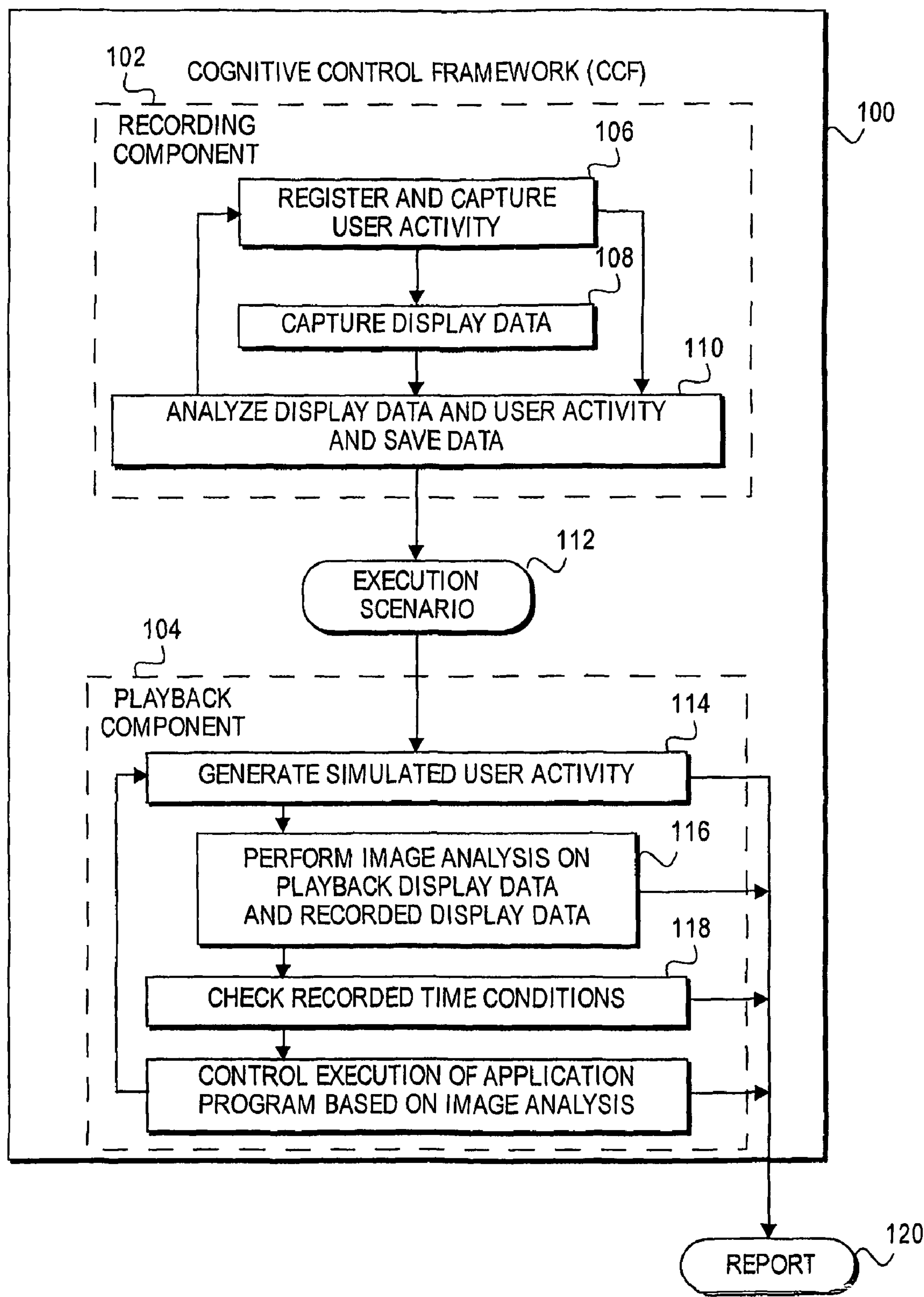
FIG. 1 is a diagram of a cognitive control framework system according to an embodiment of the present invention.

FIG. 1 is a diagram of a cognitive control framework (CCF) system 100 according to an embodiment of the present invention. FIG. 1 shows two components, recording component 102 and playback component 104. These components may be implemented in software, firmware, or hardware, or a combination of software, firmware and hardware. In the recording component, the CCF system registers and captures user input activity at block 106. For example, the user may make input choices over time to an application program being executed by a computer system using a mouse, keyboard, or other input device. This input data is captured and stored by the CCF system. Next, at block 108, the display data may be captured (e.g. screen shots are taken). In one embodiment, the display data may captured only when user input has been received by the application program. The display data is also saved. At block 110, the data captured during blocks 106 and 108 may be analyzed and saved. These processes may be repeated a plurality of times. The result of the processing of the recording component comprises an execution scenario 112 for the application program being processed by the system. In one embodiment, the execution scenario comprises a script containing Extended Markup Language (XML) tags. The execution scenario describes a sequence of user inputs to the application program, corresponding display images on a GUI of the application program, and commands directing the application program to perform some actions.

At a later point in time, during the playback phase the playback component 104 may be initiated. At block 114, simulated user activity may be generated based on the execution scenario. That is, saved inputs and commands from the execution scenario may be input to the application program for purposes of automatic control using the CCF system. While the application program processes this data, display data may be changed on the display as a result. At block 116, the CCF system performs image analysis on the playback display data currently being shown as a result of application program processing and the display data captured during the recording phase. At block 118, recorded time conditions may be checked to take into account possible variations in playback. For example, the time when an object appears may be within a time interval based on a recorded time. For example, in one embodiment a lower bound time (time to start the search) may be extracted from the saved data in the execution scenario and an upper bound time may be the lower bound time plus 10%, or some other appropriate value. Processing of blocks 114, 116, and 118 each result in data being stored in report 120. At block 119, the CCF system controls execution of the application program based on the results of the image analysis. Blocks 114, 116 and 118 may be repeated for each in a sequence of user input data items from the execution scenario.

The time interval between sequential actions is a part of the captured execution scenario. However, while following the execution scenario in the playback phase, one should not expect that the time interval between any two actions at playback will be equal to the time interval between the same two actions during the recording phase. There are a number of objective reasons why this interval could be different on playback than during recording. For example, the application program during recording and playback may be executed on different computer systems having different processor speeds, or an application program could require different times for the same actions during playback due to accesses of external data or resources. This indicates a requirement in the CCF system to handle flexible time conditions, e.g. handle some tolerance for the time interval between actions during the playback phase. During that time interval at playback, the system checks the recorded display data to the playback display data several times to determine if the playback display data is substantially similar to the recorded display data. A finding that the two are substantially similar indicates that a previous user action has completed and the system can progress to the next action in the execution scenario. This activity may be similar to the situation where the user is interacting with the application program and pauses periodically to view the display to determine if the expected visible changes to the display have been made by the application program based on previous actions. If so, then a new action may be performed. If at the end of a higher bound of the time interval the application program has not produced an image on the display that the CCF system expected according to the execution scenario, then the CCF system may interrupt the playback of the execution scenario and generate an error report describing how the execution scenario has not been followed. In one embodiment, the scenario may be corrected and the CCF system may be required to use other branches to continue.

The cognitive control framework (CCF) system of embodiments of the present invention performs image analysis and object detection processing on display data from the GUI of the application program. The CCF system includes comparing an image captured during a recording phase (called IR) to the corresponding image captured during the playback phase (called IP). One task of the system is to detect an object in the IR to which the user applied an action, find the corresponding object in the IP, and continue progress on the execution path of the execution scenario by applying the action to the detected object. These steps may be repeated for multiple objects within an image, and may be repeated across multiple pairs of IRs and IPs over time. An object that the user has applied an action to may be called an "object of action." Absence in the IP of the object of action corresponding to the one-found at IR means that one should capture the IP again at a later time and try to find the object of action again. Finally, either an object of action may be found in the IP or execution of the scenario may be halted and a report generated describing how the wrong state was achieved and the scenario may not be continued. In embodiments of the present invention, this detection of objects of action may be done in real time during the playback phase, progressing from one action to another. Thus, the image analysis process employed must have good performance so as to introduce only a minimal disturbance to the time conditions at playback.

The CCF system of embodiments of the present invention comprises an image analysis and detecting process. Such a process has at least two requirements. First, the process should be able to overcome some variations in the captured images such as different color scheme, fonts, and the layout and state of the visual elements. In one embodiment, comparison constraints for checking these items (color scheme, fonts, etc.) may be set to specified parameters in accordance with specific needs. Overcoming these variations is desirable because recording and playback might be executed in different operating environments such as different screen resolutions, different visual schemes, different window layouts, and so on. Additionally, there could be insignificant differences in corresponding IR (usually captured after an action was applied to an object of interest) and IP pairs (captured after a previous action was completed). Second, the implementation of the image analysis and object detection process should be fast enough to introduce only minimal disturbances and delay of application execution during playback.

By processing captured images, the system builds descriptions of the images in terms of the objects presented on them. Each display object may be represented by its contour and a plurality of properties. Table I enumerates some possible contour properties for use in the present invention. In other embodiments, other properties may also be used.

TABLE 1

| Contour properties | |
|---|---|
| Property | Description |
| Location | Coordinates (on the image) of the contour center. |
| Image size | Characteristic contour size. In case of rectangular contours they are just vertical and horizontal sizes. For controls of more complicated shape, another format may be used. |
| Layout | Connection to other contours that lay in proximity to its boundaries/layout pattern of this contour. |
| Content Type | Indicates what is inside of the contour: text, image or a combination. |
| Content | If the content type is text, then a text string; if image (e.g. icon), then the image. |

Figure 2:
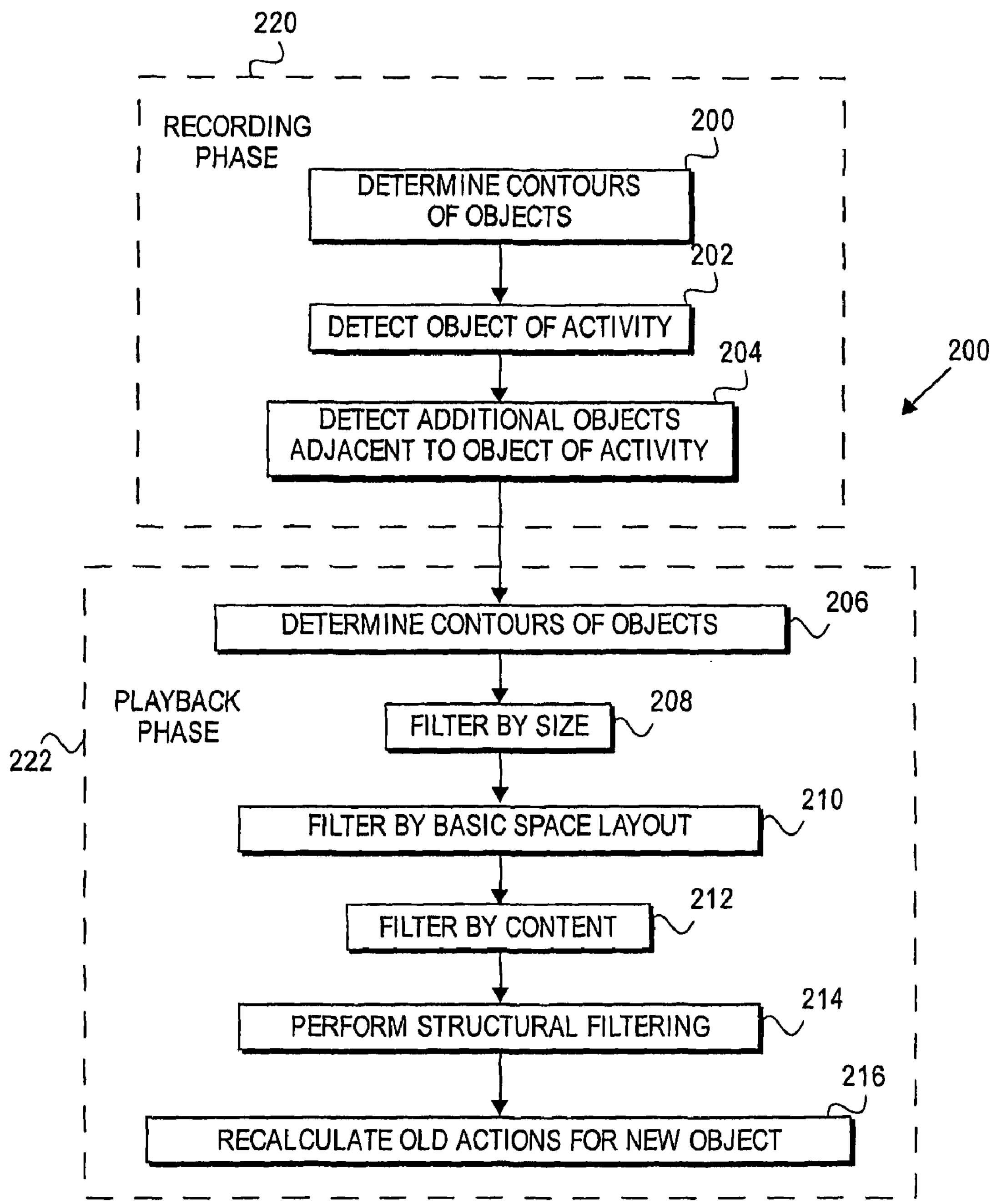
FIG. 2 is a flow diagram illustrating processing in a cognitive control framework according to an embodiment of the present invention.

FIG. 2 is a flow diagram illustrating processing of a CCF system according to an embodiment of the present invention. During the recording phase 220 handled by recording component 102, at block 200 the system determines contours of objects in the IR. At block 202, the system detects a current object of activity. At block 204, the system detects additional objects adjacent to the current object of activity in the IR. These steps (200, 202, and 204) may be repeated over time for all objects of activity during execution of the application program in the recording phase.

Next, during the playback phase 222 handled by playback component 104, at block 206 the CCF system determines the contours of objects in the IP. At block 208, the CCF system filters contours by size to determine contours that may become hypotheses for active objects and contours that connect them. At block 210, the CCF system filters the objects by basic space layout in the IP to determine subsets of hypotheses for active and additional objects. For example, filtering criteria for space layout may include tables, wizards, and menus. In one embodiment, the user (or CCF schema with a cascade search) could set both strict (e.g. "as is") and fuzzy (e.g. "object could be near each other") conditions. At block 212, the CCF system filters the objects by content to produce further subsets of hypotheses for active and additional objects. For example, the filtering criteria by content may include images and text. Moreover, in one embodiment, the user (or CCF schema with cascade search) could set both strict (e.g. "image should have difference in a few points and text should have minimal differences on a base of Levenstein distance") and fuzzy (e.g. "image could be stable to highlighting and have insignificant structural changes and text could have noticeable differences on a base of Levenstein distance without consideration of digits") conditions. At block 214, the CCF system performs structural filtering of the objects to produce a best hypothesis for active objects.

Finally, at block 216, the CCF system recalculates old actions for a new object by applying the action according to the execution scenario. For example, suppose the user selected (via the mouse) the screen location at (X=70, Y=200), and that a button is displayed at the rectangle denoted (X1=50, Y1=150, X2=100, Y2=100). In the IP, the button may be represented as a rectangle denoted (X1=250, Y1=300, X2=200, Y2=100). For a general view, coordinates of the top left corner and the size of the rectangle may be changed. The mouse click (user selection) may be recalculated based on the position of the button and the scaled size (for X and Y coordinates). The calculation gives the new mouse click coordinates (e.g., X=290, Y=350).

Table II shows the input data and output of the image analysis process for FIG. 2.

TABLE II

| Image Analysis Processing | | | |
|---|---|---|---|
| Step | Input Data | Result | Input parameters and Description |
| 1. Contouring | Image from receding (IR) | Contours | Thresholds, distances between objects (with some tolerance). Intel ® OpenCV library used in one embodiment. |
| 2. Detecting object of activity | Image IR and contours from previous step. | Contour representing object of activity | Typical object size (with tolerance) for object of action. Optical character recognition (OCR) and fuzzy text comparison, e.g. with Levenshtein distance. |

TABLE II-continued

Image Analysis Processing

| Step | Input Data | Result | Input parameters and Description |
|---|---|---|---|
| 3. Detecting additional objects around object of activity | Image IR, contours and active objects. | Additional objects and their layout against object of action | Typical object size (with tolerance) for additional objects. Structural analysis, e.g. "criss-cross" rules. |
| 4. Contouring | Image from playback (IP) | Contours | Thresholds, distances between objects (with some tolerance). Intel ® OpenCV library used in one embodiment. |
| 5. Filtering by size | Contours from previous step | Contours that become hypotheses for active object and contours connected with them | Mean object size (with tolerance) based on active object characteristics evaluated at Step 2. Typical object size (with tolerance) for additional objects. Filtering out contours that don't fit into input size limits. |
| 6. Filtering by basic space layout | Subsets of hypotheses for active and additional objects | Decreased subsets of hypotheses for active and additional objects | Fuzzy distance filtration. Fuzzy filtration for directions. |
| 7. Filtering by content | Subsets of hypotheses for active and additional objects | Decreased subsets of hypotheses for active and additional objects | OCR and fuzzy text comparison, e.g. with Levenshtein distance. Fuzzy image comparison. Using "fuzzy content type" method for filtration. |
| 8. Structural filtering | Subsets of hypotheses for active and additional objects | The best hypothesis for active objects. | Method based on fuzzy triple links both between objects from IR and their hypotheses from IP. It's stable to additional objects which don't have strong structural links with active object. Moreover, one can use the result of this method to choose the best hypotheses for active objects. Some other methods, e.g. Hough transformation may also be used here. |
| 9. Recalculating old actions for new object | Object of action | Applied the action according to the execution scenario | Recalculating action coordinates in IP (playback image) coordinate system |

During filtering at each step there is an evaluation of specific contour properties (as required for a specific filter). This filtering pipeline is designed in such a way that the most time consuming evaluation steps are shifted to later in the processing pipeline when the number of contours (hypotheses) is smaller. By using this approach, the overall computational cost may be decreased, thereby helping to ensure good performance of the system.

It is useful to maintain a compromise in order to make sure that the system does not filter out some contours in the early steps that may be later determined to be either a hypothesis of an object of activity or objects connected with an object of activity. In this regard, predefined input parameters may be set to broad limits that requires spending a little more time on processing of additional contours (hypotheses), but ensure that the system has not dropped important contours.

Example pseudo-code for one embodiment of the present invention is shown in Table III.

TABLE III

Pseudo Code Example

```
BEGIN CCF
<<<<<<<< Recording >>>>>>>>
LOOP /*recording, e.g. till a special key combination */
  Wait on user action /*mouse, keyboard, it's possible to set something
else*/
  Hook and save screenshot /*e.g. <Screenshot fileName="1.png"/>*/
  Save time interval from the previous action /*e.g. <Sleep
duration="2000"/>*/
  Save information about user action
    /*e.g. <Mouse action="RightClick" x="100" y="200"/>*/
END LOOP /*recording, e.g. till a special key combination*/
EXIT
<<<<<<<< Post-processing >>>>>>>
Process saved data into a more compact form. It's possible for the user to
change it for his or her needs.
<<<<<<<< Playback >>>>>>
LOOP /*till the end of saved data*/
  Load time interval and wait in accordance with it.
  IF [actions depend on coordinates on the screen] /*e.g. mouse click*/
THEN
    Load saved screenshot
    Detect object of action /*e.g. button*/, nearest structure-layout /*e.g.
menu items around button*/ and other useful info on saved screenshot
    TimeConditions_label: Hook the current screenshot
    Use image processing to find the corresponding object on the current
screenshot /*it's possible to require more information from saved
screenshot during search*/
     IF [Object not found] THEN
       IF [Check time condition] /*e.g. it's possible to repeat search
3 times with 1000-msec step, for example*/ THEN
        GOTO TimeConditions_label
      ELSE
        EXIT with error code /*moreover, it's possible to send
corresponding report to log-file*/
      END IF
    ELSE
       Recalculate actions on a base of new found objects /*e.g.
recalculate new coordinates for mouse click*/
    END IF
```

TABLE III-continued

| Pseudo Code Example |
| --- |
| END IF<br>Produce actions /*it could be changed actions after image processing; moreover, it's possible to finish execution in case of wrong situations during actions*/<br>END LOOP /*till the end of saved data*/<br>EXIT<br>END CCF |

Figure 3:
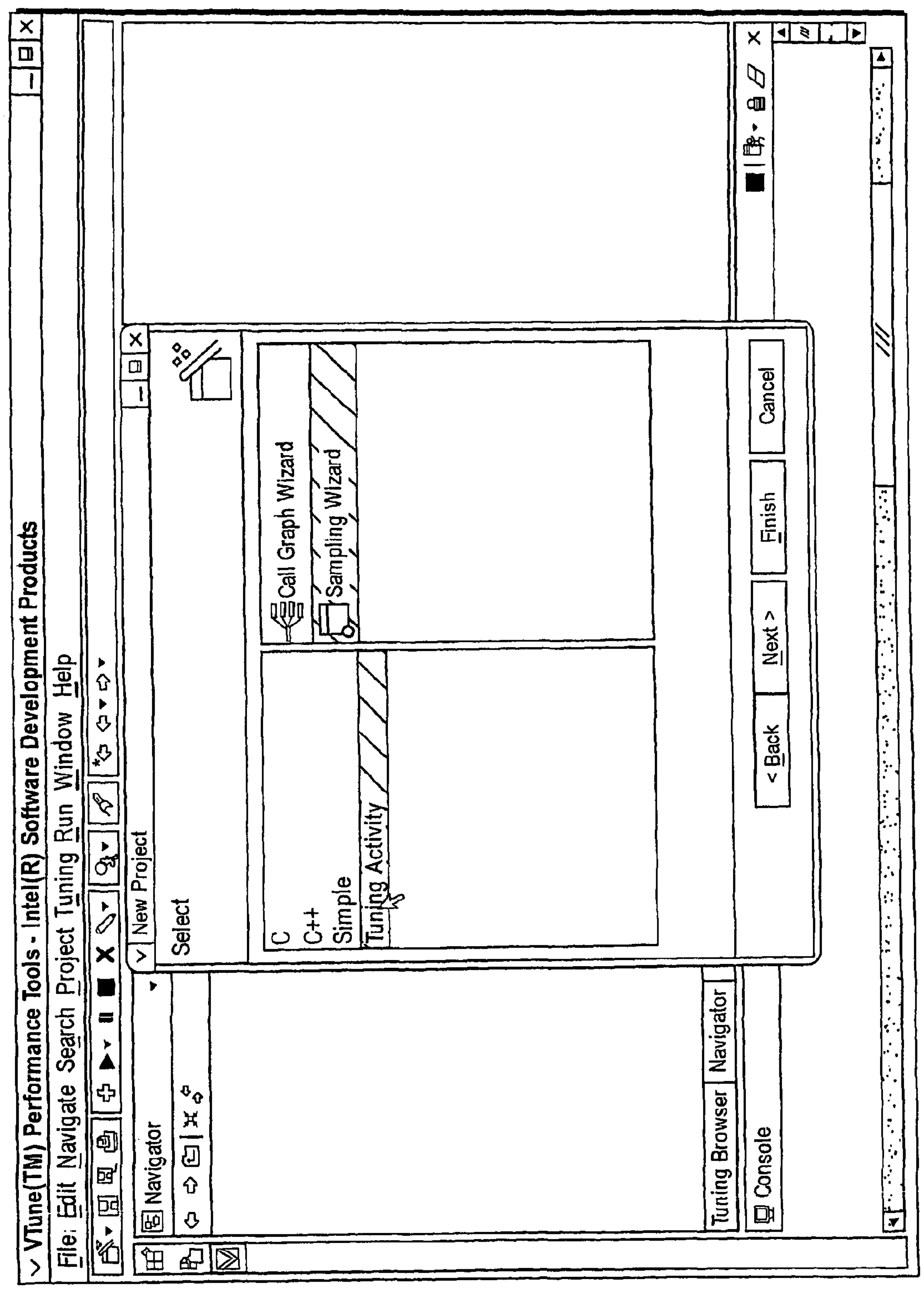
FIG. 3 is an example display of the GUI of an application program captured and saved during a recording phase.
Figure 4:
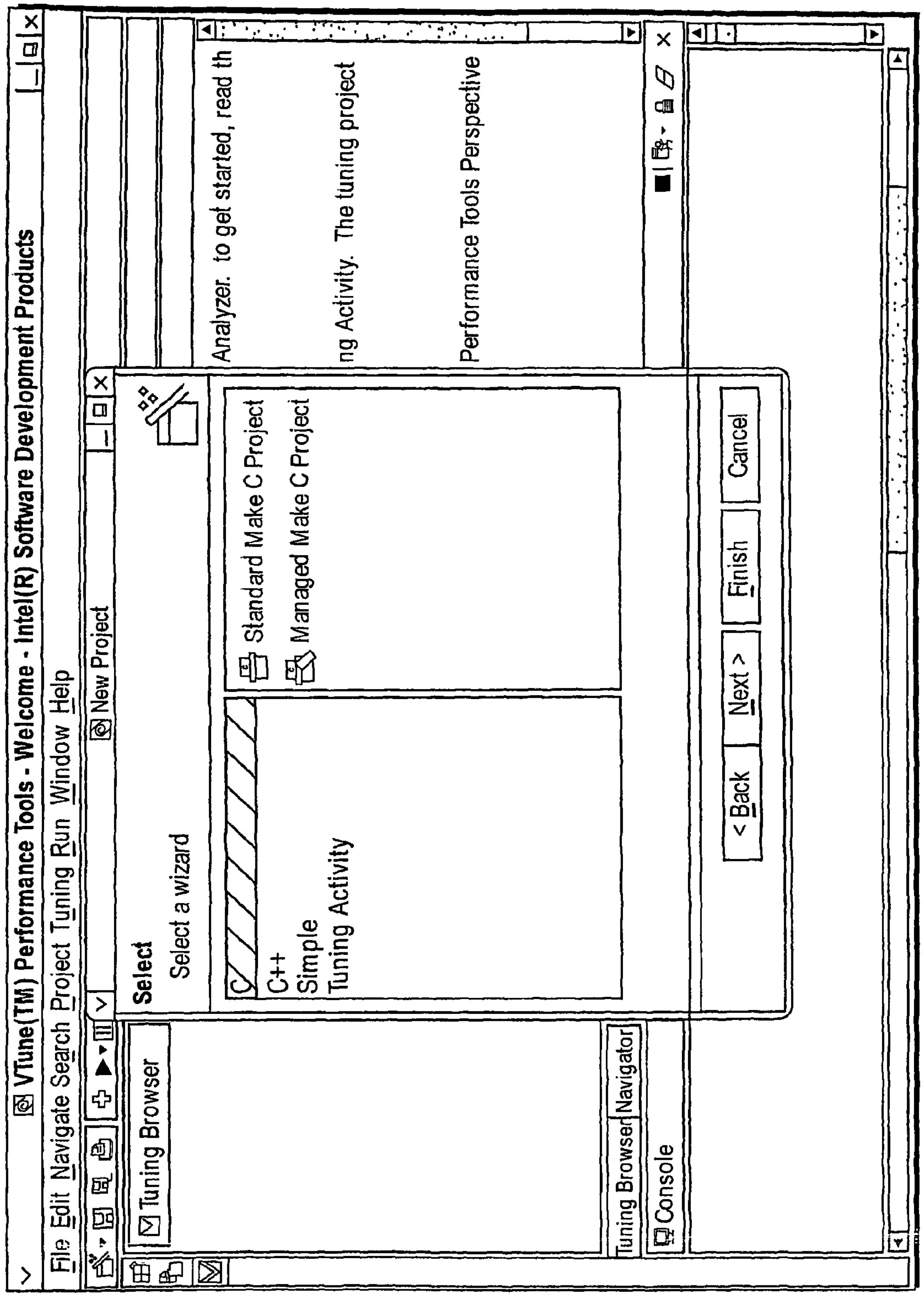
FIG. 4 is an example display of the GUI of an application program captured during a playback phase.
Figure 5:
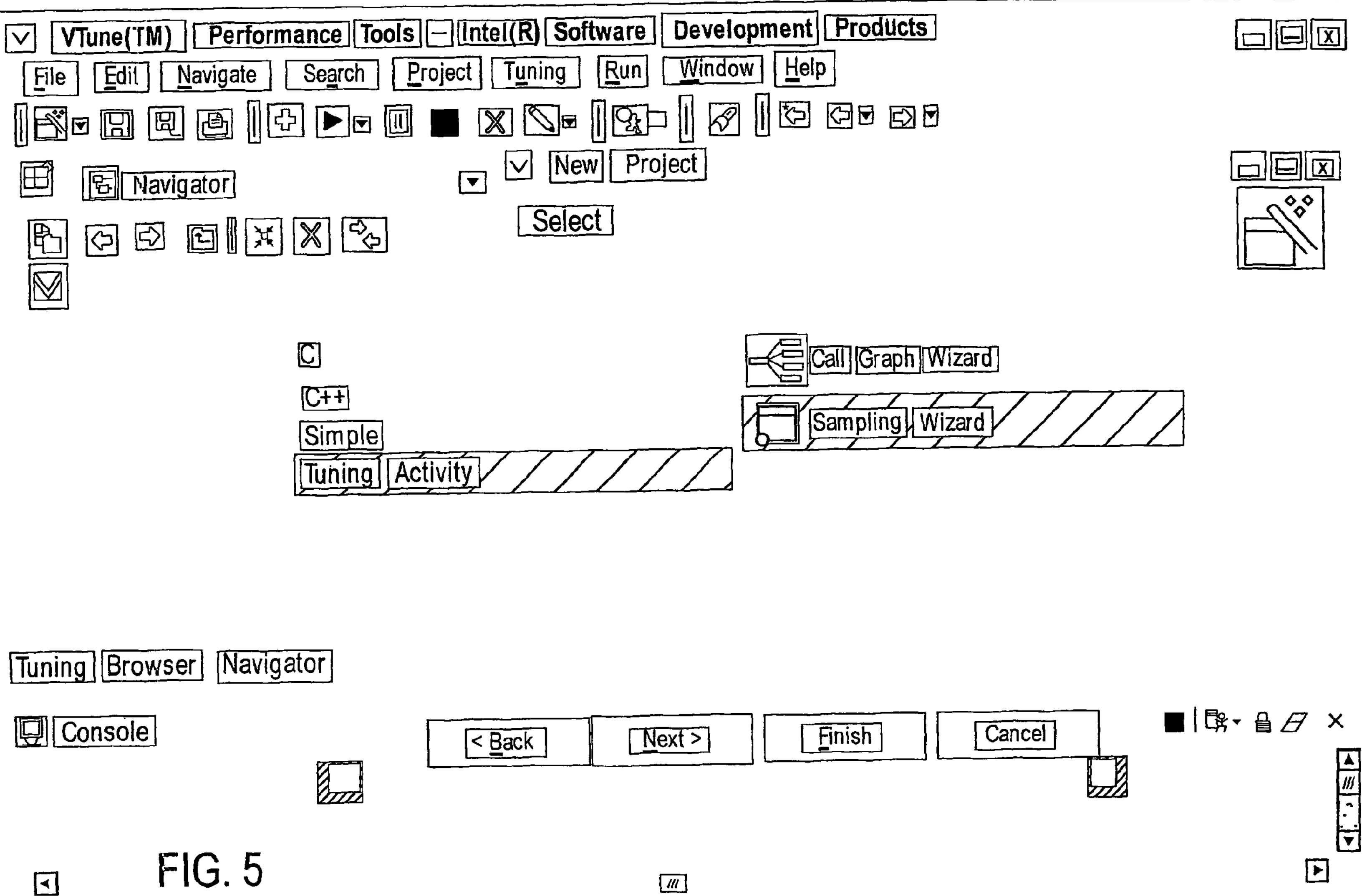
FIG. 5 is an example image illustrating objects identified during contouring operations of the recording phase according to an embodiment of the present invention.
Figure 6:
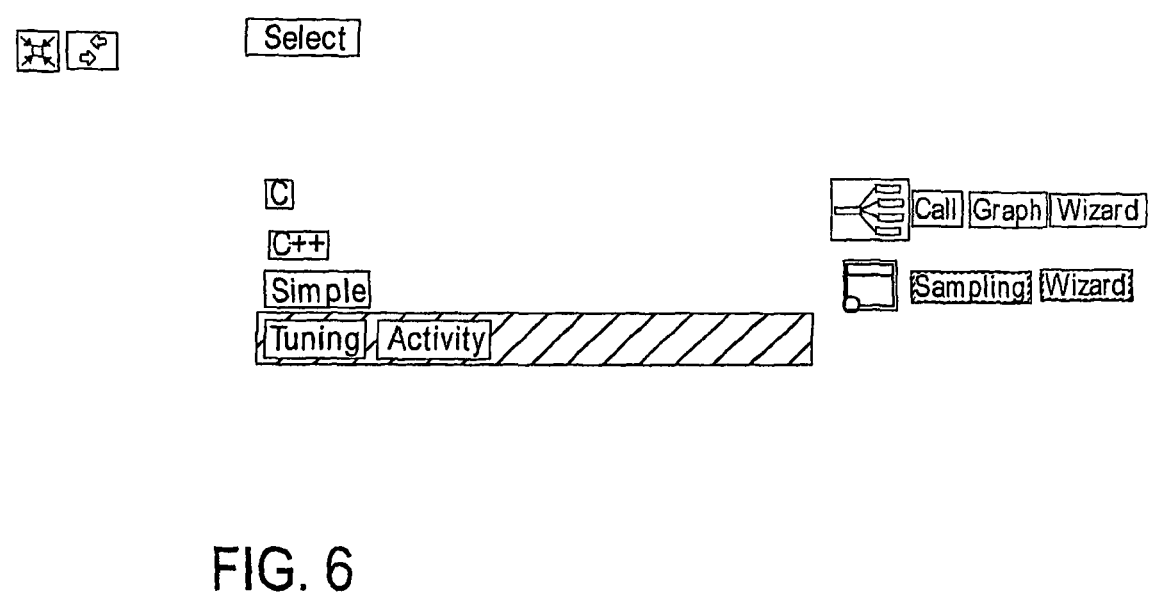
Figure 7:
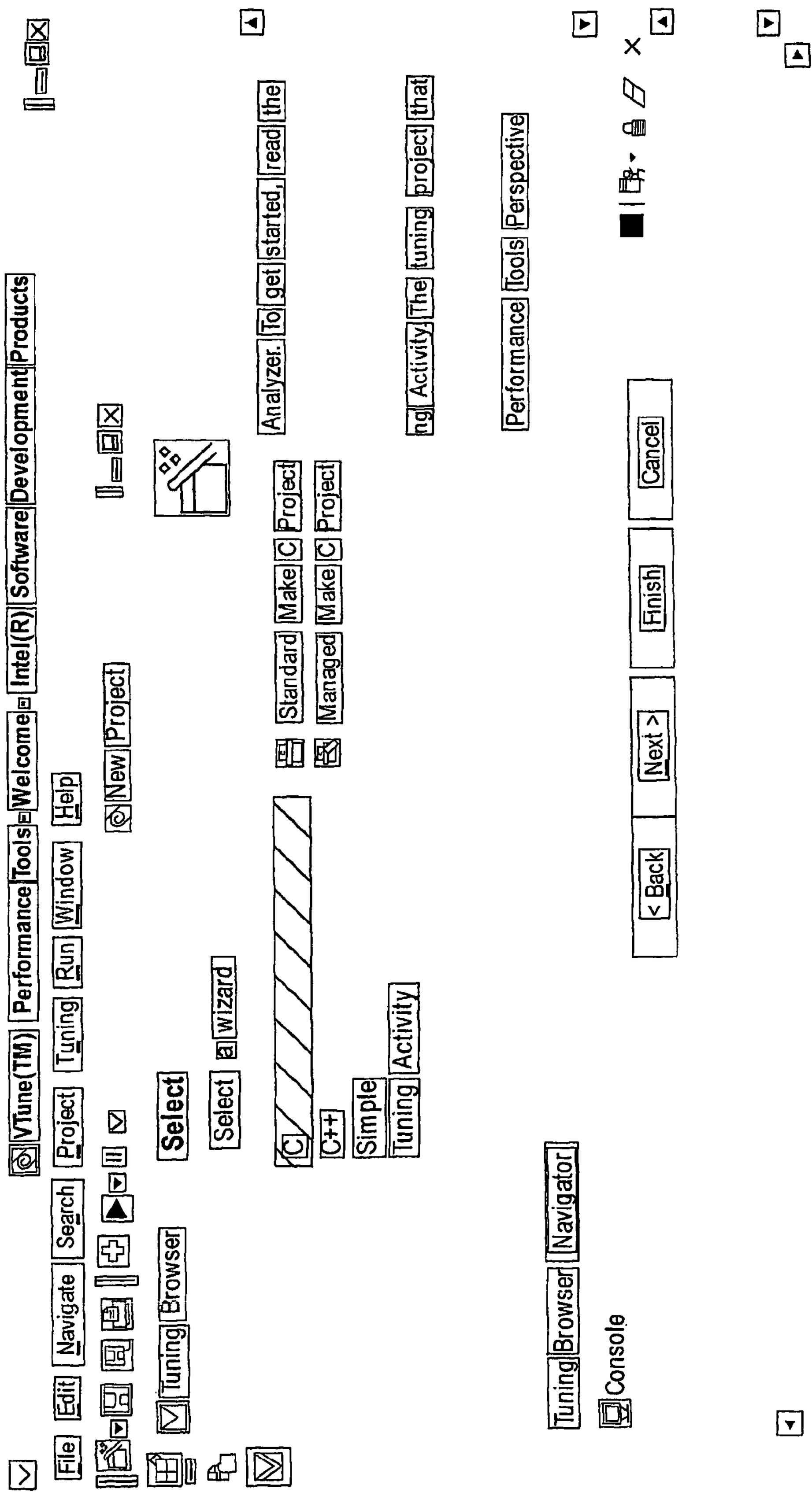
FIG. 7 is an example image illustrating objects identified during contouring operations of the playback phase according to an embodiment of the present invention.
Figure 8:
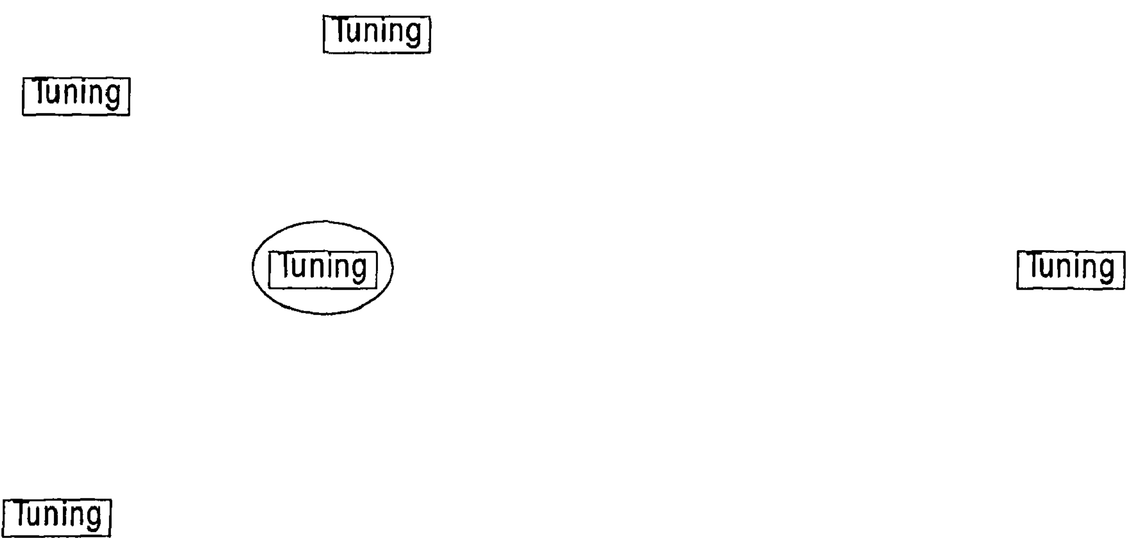
FIG. 8 is an example image illustrating a hypothesis during the playback phase according to an embodiment of the present invention.

Embodiments of the present invention including image analysis and object of activity detection on two images may be illustrated by the following examples using a performance analyzer application program. These figures show applying the process blocks of FIG. 2 to a first image from the recording phase (IR) and a corresponding image from the playback phase (IP). FIG. 3 is an example display of the GUI of an application program captured and saved during a recording phase. This IR screen shot shows that the item "Tuning Activity" was selected by the user using a mouse. FIG. 4 is an example display of the GUI of an application program captured during a playback phase. Note there are some insignificant changes in the displayed windows in comparison to FIG. 3. FIG. 5 is an example image illustrating objects identified during contouring operations of the recording phase according to an embodiment of the present invention as performed on the image of FIG. 3. FIG. 5 shows the sample output from block 200 of FIG. 2. FIG. 6 is an example image illustrating objects of activity of the recording phase according to an embodiment of the present invention as performed on the image of FIG. 5. These contours were identified after performing blocks 202 and 204 of FIG. 2 on the image from FIG. 5. The contour with the text labeled "Tuning" has been determined in this example to be the current object of activity. FIG. 7 is an example image illustrating objects identified during contouring operations of the playback phase according to an embodiment of the present invention. This image is output from performing block 206 of FIG. 2 on the sample image of FIG. 4. Finally, FIG. 8 is an example image illustrating a hypothesis during the playback phase according to an embodiment of the present invention. FIG. 8 shows hypotheses from FIG. 7 for the "Tuning Activity" object of activity from FIG. 6. Size, space, content, and structural filtration of blocks 206-214 has been performed. The ellipse represents the contour which was selected as the best hypothesis from performing block 216 of FIG. 2. A new point for the mouse click is recalculated relative to the given object (i.e., the "tuning" display object).

In some scenarios, filtration according to blocks 208 through 212 still result in many hypotheses to consider. When the number of hypotheses is large, more computational resources are needed. In one embodiment of the present invention, a structural content method for hypotheses filtration may be used to reduce the number of GUI hypotheses for objects in space (two dimensional (2D) for screen shots and multidimensional in the general case). This structural content method comprises a search scheme that is simple yet powerful to select the right hypotheses despite the presence of several GUI noise conditions. In embodiments of the present invention, the noise conditions may comprise changeable color schemes, highlighting of items, noise from video devices, anti-aliasing, and other effects.

After pre-filtration (according to size, text, etc. as in block 208 through 212 of FIG. 2), many hypotheses may remain for the objects of FIG. 4. The term hypothesis as used herein means a contour on the playback image which corresponds to a contour on the saved (recorded) image at a point in time. This means the previously applied filters didn't reject this correspondence of objects.

An embodiment of the present invention comprises a method for determining search solutions. The present method improves solutions based on knowledge about specific GUI and human behavior. Embodiments of the present invention provide an iterative method of searching for the correct hypotheses in various GUI representations and varying test requirements from users. This method correlates well with changes to an application program during product evolution.

Let's start the search for the correct hypotheses by analyzing active and additional objects from the recorded image and the playback image. Next, a correspondence between indicated objects and hypotheses on the playback image may be determined. Finally, user actions may be recalculated and the resulting images generated. In case the search fails, the search may be tried again and an appropriate warning/error message may be generated. Usually, strict matching between both images (e.g., recorded image and playback image) is not required during the search. Several reasons for mismatching between the GUIs of the recorded image and the playback image are discussed below and illustrated in FIGS. 9-18.

Figure 9:
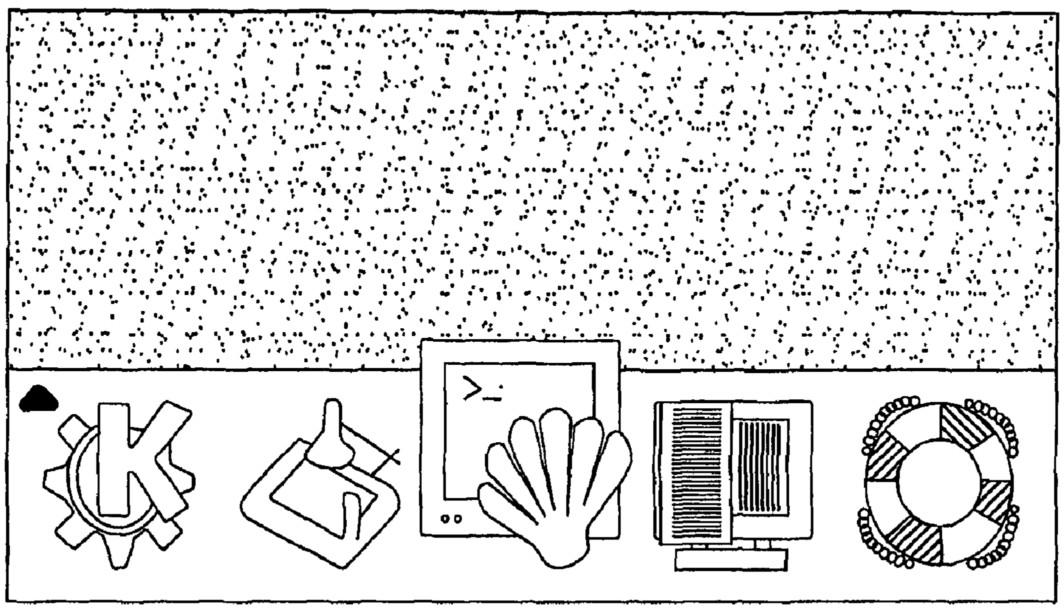
FIG. 9 is an example image illustrating an object in a recorded image according to an embodiment of the present invention.
Figure 10:
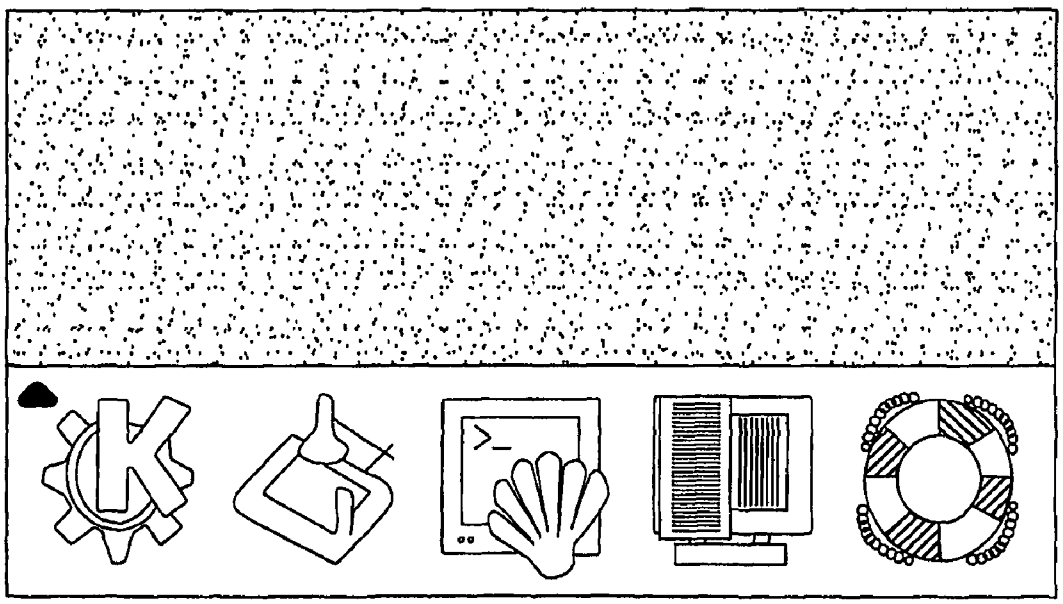
FIG. 10 is an example image illustrating another object in a playback image according to an embodiment of the present invention.

One area of mismatch is the situation wherein the object sizes may have changed when comparing the object in the recorded image and in the playback image. FIG. 9 is an example illustrating an object (i.e., the "display with clam shell" icon) at a first size on the recorded image. FIG. 10 is an example illustrating the same object but at a second size on the playback image. Several possible reasons for the mismatch include different fonts may be used for different operating systems, different screen resolutions may be used, there may be a difference in the amount of data present in the image, and animation may be implemented differently.

Figure 11:
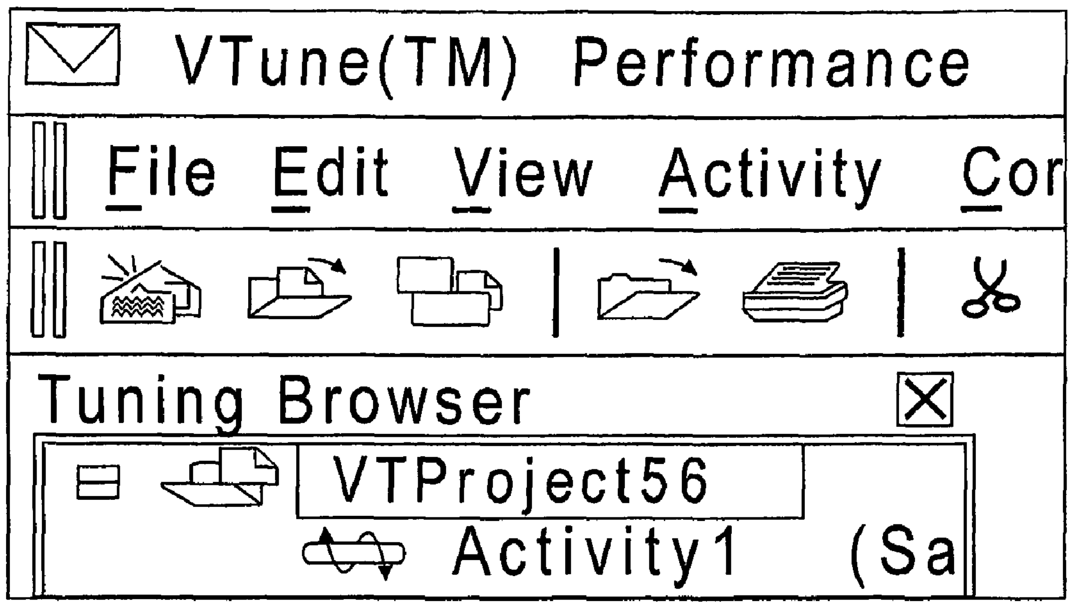
FIG. 11 is an example image illustrating a highlighted object in a recorded image according to an embodiment of the present invention.
Figure 12:
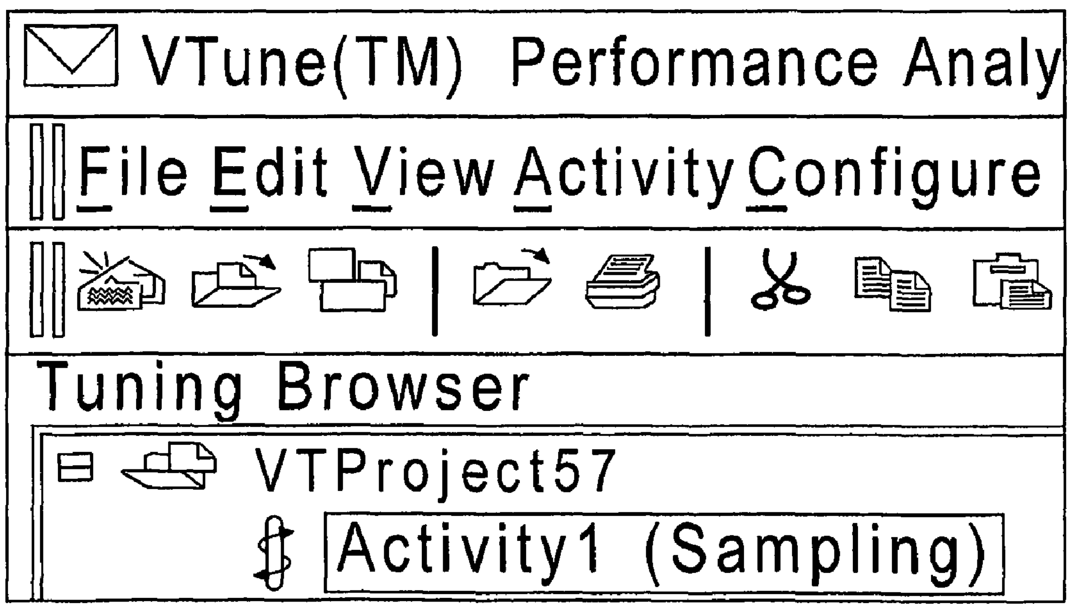
FIG. 12 is an example image illustrating another highlighted object in a playback image according to an embodiment of the present invention.

Another area of mismatch is the situation wherein the content of a text object may have changed. FIG. 11 is an example illustrating two text objects (i.e., the "VTProject 56" and "Activity1(Sampling)" objects) wherein a first one of the text objects is highlighted on the recorded image. FIG. 12 is an example illustrating the two text objects (i.e., the "VTProject 57" and "Activity1(Sampling)" objects) wherein a second one of the text objects is highlighted on the playback image. Several possible reasons for the mismatch include overlapping by other objects, division of words and dates, small errors during optical character recognition (OCR) processing (e.g., because of highlighting or anti-aliasing), and differences in animation.

Figure 13:
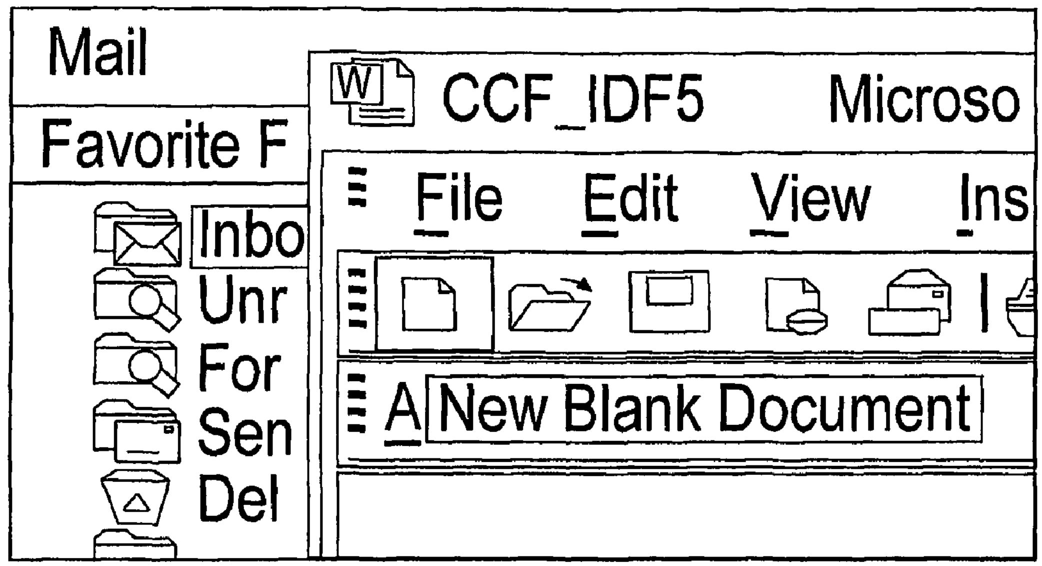
FIG. 13 is an example image illustrating overlapping objects in a recorded image according to an embodiment of the present invention.
Figure 14:
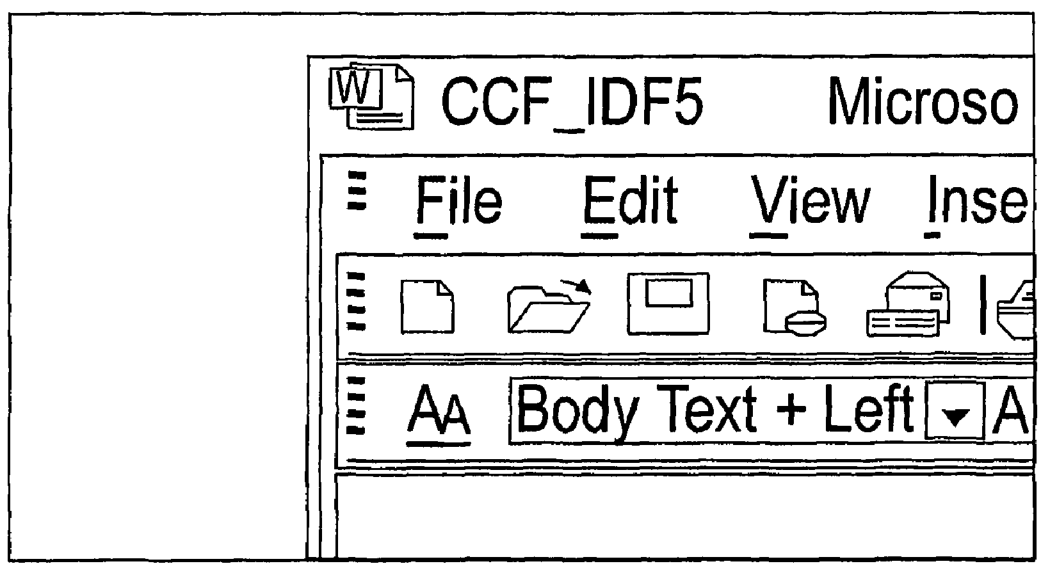
FIG. 14 is an example image illustrating another object in a playback image according to an embodiment of the present invention.

Another area of mismatch is the situation wherein the content of an image may have changed. FIG. 13 is an example illustrating an image having a partial background visible behind a selected window. FIG. 14 is an example illustrating an image having a blank background visible behind the selected window. Several possible reasons for the mismatch include highlighting changes, overlapping of an object by other objects, and differences in animation.

Yet another area of mismatch is the situation wherein the layout has changed between the recorded image and the playback image. FIG. 15 is an example illustrating objects in a first layout. FIG. 16 is an example illustrating the same objects in a second layout. Several possible reasons for this mismatch include bad scalable fonts, different fonts, changes in table formats, and overlapping or inserts with other controls.

Figure 17:
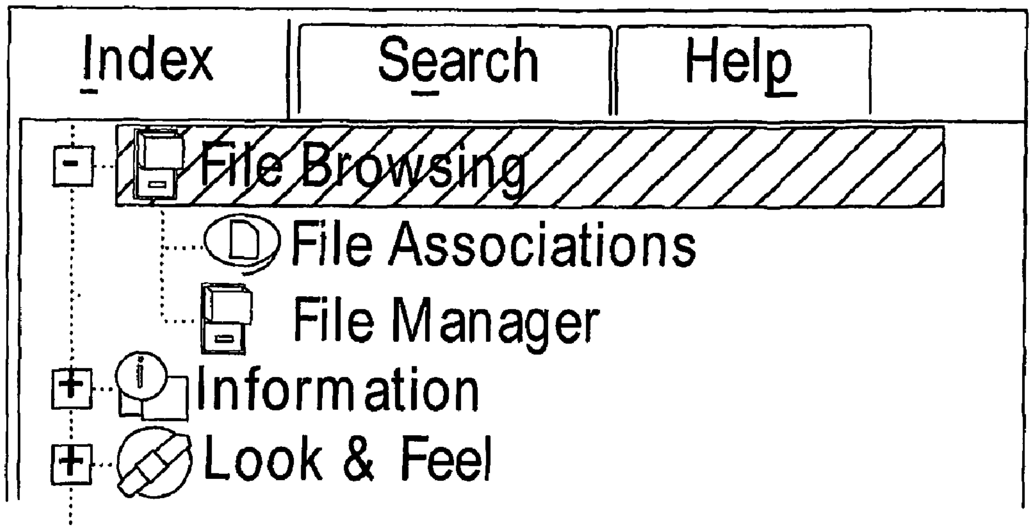
FIG. 17 is an example image illustrating an index structure in a recorded image according to an embodiment of the present invention.
Figure 18:
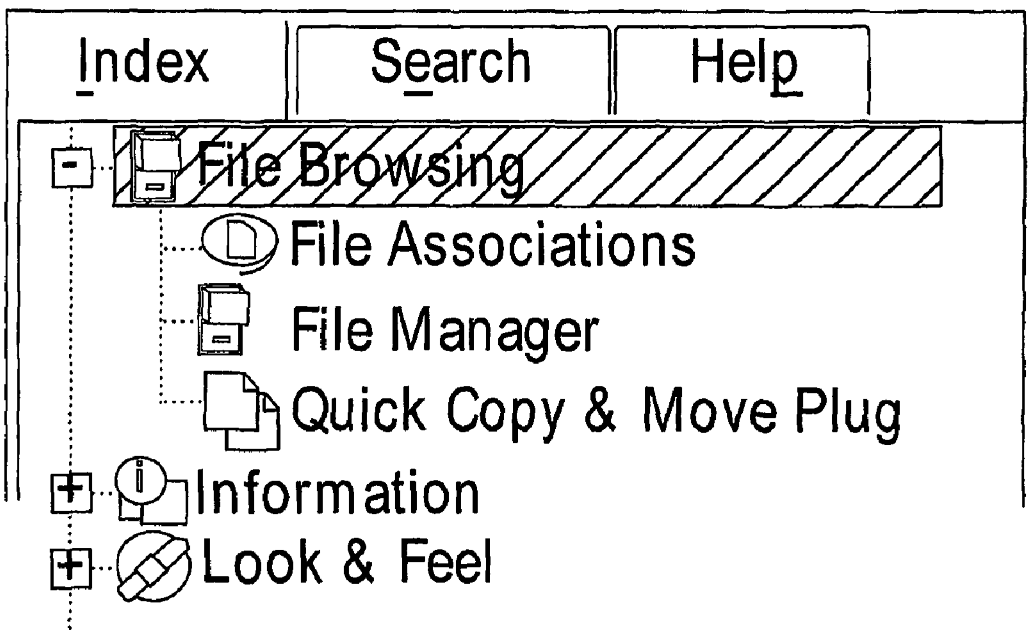
FIG. 18 is an example image illustrating another index structure in a playback image according to an embodiment of the present invention.

A further area of mismatch is the situation wherein distances between objects have changed. FIG. 17 is an example illustrating an index structure in a recorded image. FIG. 18 is an example illustrating the index structure in the playback image. Note that the index has an additional item (i.e., "Quick Copy & Move Plug") in the playback image, so other items such as the "Information" object and the "Look & Feel" object have shifted position. Several possible reasons for this kind of mismatch include changes in tables and menus, and new fonts and sizes of text objects.

Figure 19:
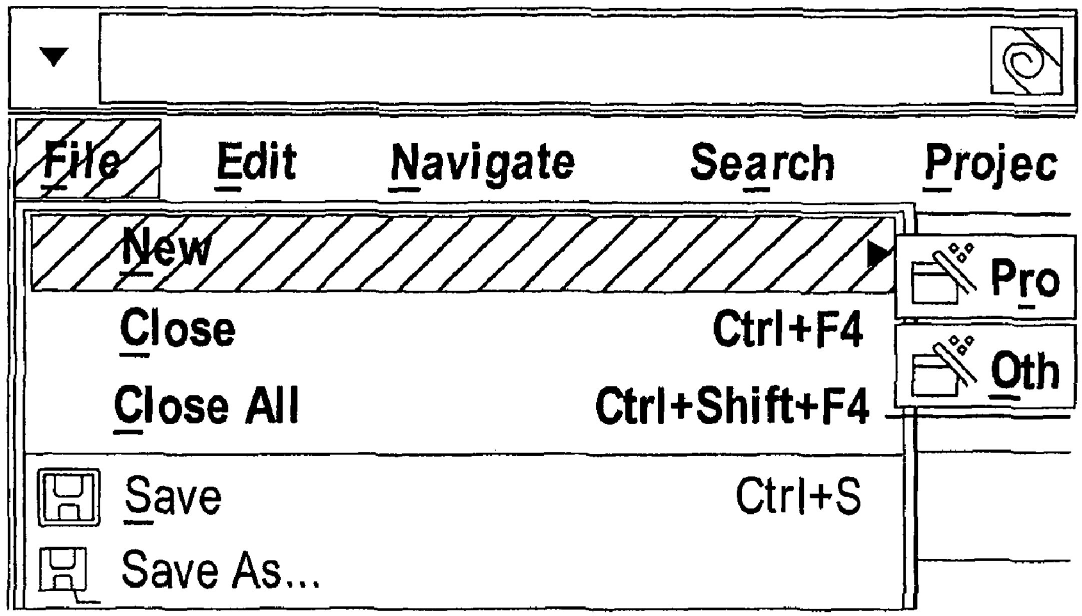
FIG. 19 is an example image illustrating a highlighted object in a recorded image according to an embodiment of the present invention.
Figure 20:
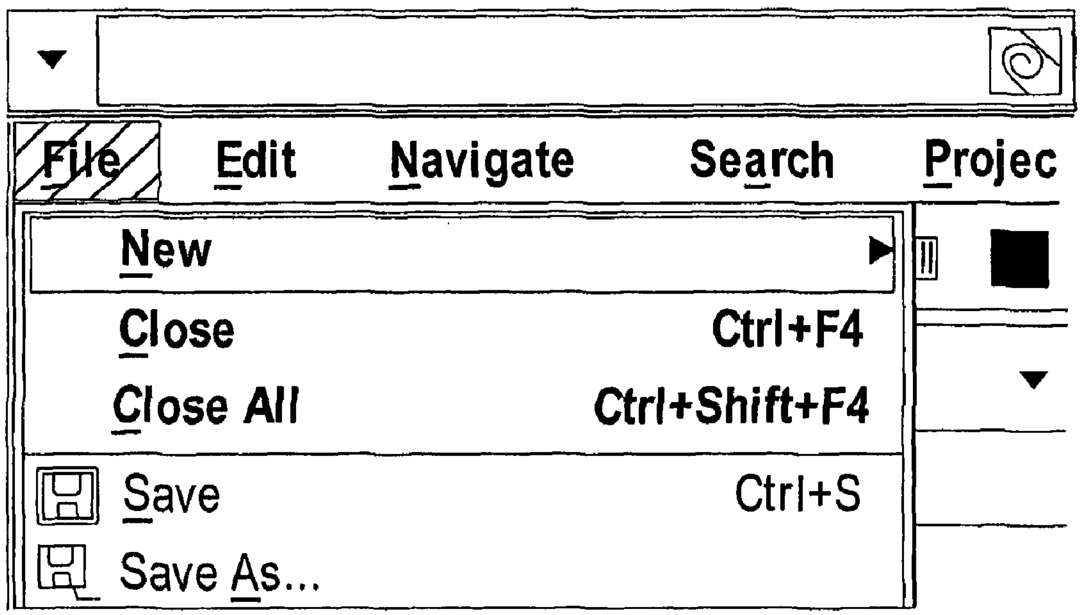
FIG. 20 is an example image illustrating another highlighted object in a correct playback image according to an embodiment of the present invention.
Figures 21, 22:
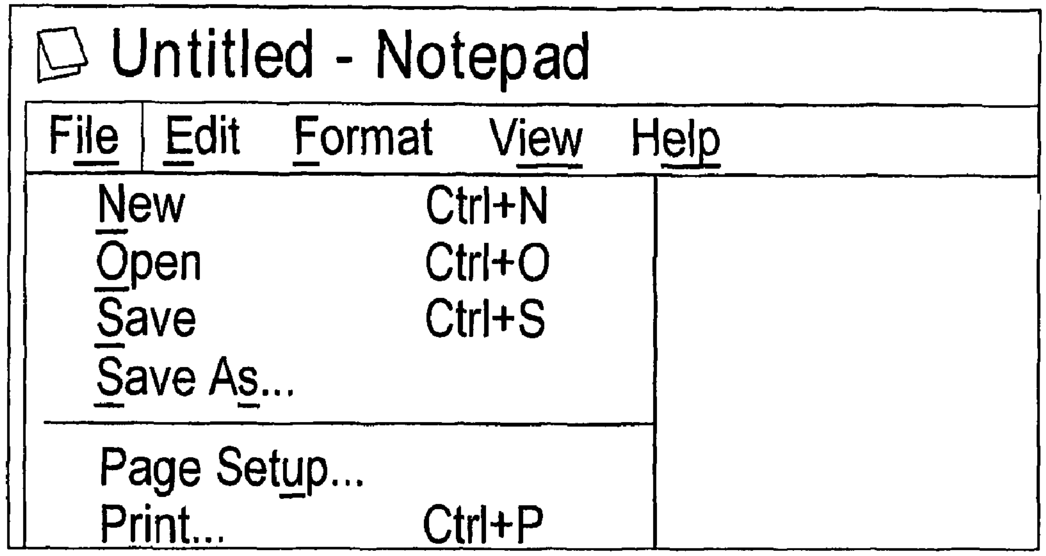
FIG. 21 is an example image illustrating another highlighted object in an incorrect playback image according to an embodiment of the present invention.
FIG. 22 is an example image illustrating a table in a recorded image according to an embodiment of the present invention.

Note that the types of GUI changes shown in FIGS. 9-18 above could be considered either insignificant or critical from the point of view of users of the Cognitive Control Framework. One scenario of requirements for testing GUIs on the basis of user needs may include handling changes in fonts and highlighting, with small differences in text content, distance between objects, and layout. For example, FIG. 19 illustrates a recorded image. A playback image is shown in FIG. 20, which correctly corresponds with the recorded image of FIG. 19. However, FIG. 21 shows an incorrect playback image, because the wrong items are in the "File" menu. Another scenario of requirements for testing GUIs may include significant changes to the layout but with the text and image content remaining the same. For example, FIG. 22 illustrates a recorded image. The correct playback image is shown in FIG. 23, even though the table layout has changed (the events are rearranged). However, in FIG. 24, the playback image is incorrect because the wrong digits are shown on the right side of the image (in the "Total" column).

Users of the Cognitive Control Framework need to be able to execute fast and automatic runs of test scenarios without specifying search details and without knowledge about all possible changes in an application program's GUI. An embodiment of the present invention comprises a method of providing iterative search with data accumulation to solve this problem.

Let's consider two extreme cases for the search: 1) the presentation should be exactly the same, and 2) any of the possible conditions discussed above could occur. Here, a user will frequently have two types of faults present in the search: the active object is not found and the wrong object is detected. Both types of fault could take place both on the correct and incorrect current playback image. Actually, this means three wrong results from four possible outcomes. One good case is the "object not found" on the incorrect playback image. Let's look at examples for wrong cases.

Figure 25:
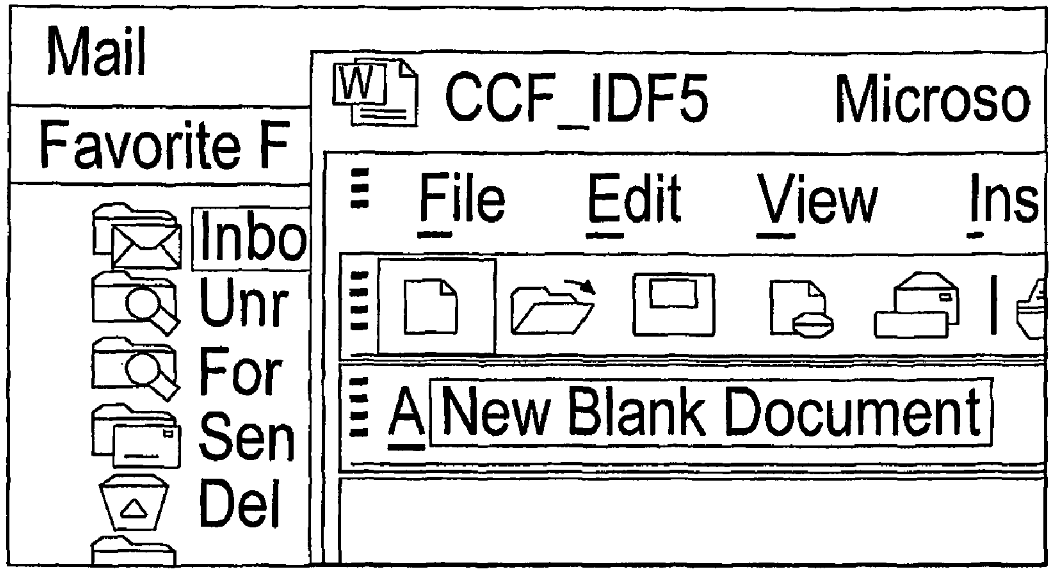
FIG. 25 is an example image illustrating display of a tool tip and an unused application in the background near a highlighted active object according to an embodiment of the present invention.
Figure 26:
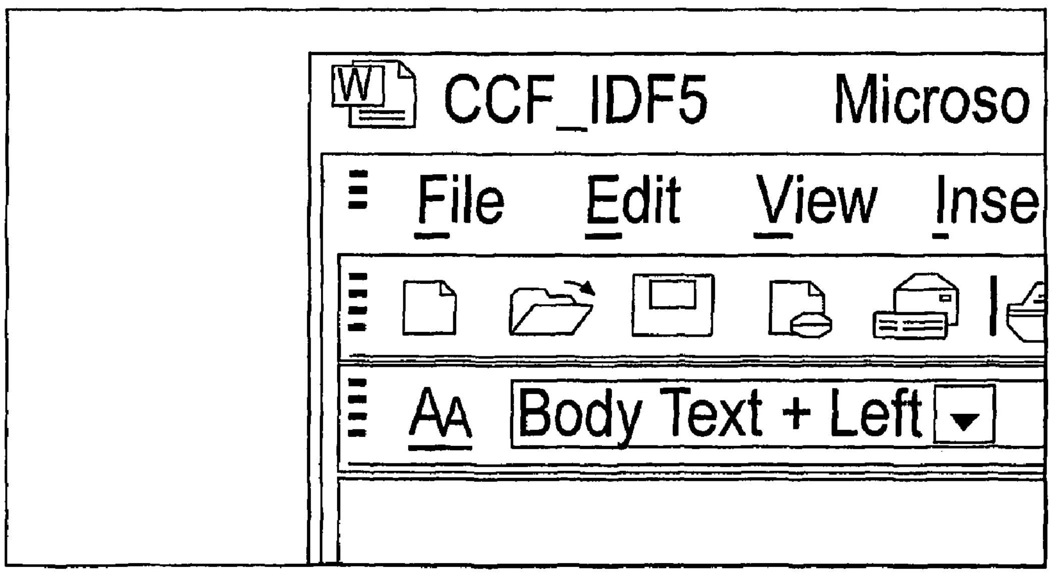
FIG. 26 is an example image illustrating additional objects near the correct hypothesis according to an embodiment of the present invention.

FIG. 25 presents a recorded image. FIG. 25 shows a tool tip (i.e., "New Blank Document") and a currently unused application program in the background near the highlighted active object (the "New Blank Document" icon). FIG. 26 shows no tool tip and the currently unused application program is missing from the playback image. Also, additional objects are shown near the right hypothesis (i.e., the "New Blank Document" button). Some objects didn't have links with the tested application program, but they were near an active object during recording (such as the electronic mail application program). There are objects which appeared only during user action (such as the tool tip of FIG. 25) and which are not displayed before a user action (e.g., a mouse move/click). There are some other changes. This is typical before noise reduction processing has been performed. Noise reduction processing does not solve the entire search problem, but it reduces the influence of wrong objects on the search outcome. Regardless, applying strict conditions on matching between the recorded image and the playback image will indicate a fault situation for any given example.

Figure 27:
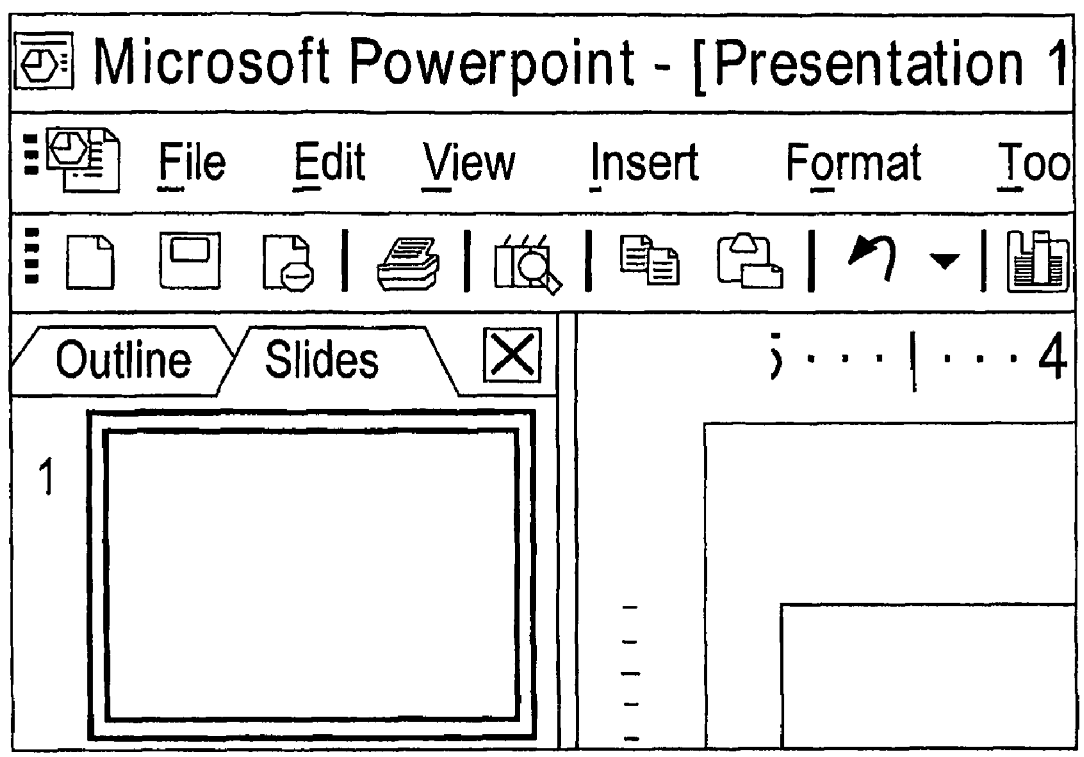
FIG. 27 is an example image illustrating similar but incorrect hypotheses for an active object of FIG. 25 according to an embodiment of the present invention.

FIG. 27 presents the playback image which does not correspond to FIG. 25 from the point of view of the search for the active object. Nevertheless a similar object is shown, so applying very soft conditions for the search will indicate an incorrect hypothesis.

This last case of applying very soft conditions for the search will indicate an incorrect hypothesis. There are similar objects (such as the "Permission" icon (third icon from left in the row of command icons) is which similar to "New Blank Document" icon (first icon from left in the row of command icons)) which could be chosen instead of the correct hypothesis. The given example isn't so obvious. Embodiments of the present invention should find the right solution but sometimes it's very difficult to weight changes in hypotheses (for example, what is more important: text size, changes in image structure or position in relation to other objects?) and detect the right one.

The examples presented are instructive in determining search limitations with the goal to avoid the three wrong results indicated above. In the overwhelming majority of cases, the recorded image and the current playback image should have a few soft (or weak) search conditions and strict other ones. Embodiments of the present invention consider different subsets of conditions for the search of an object. In some cases, a specific search may be specified by the user.

Embodiments of the present invention are based on the principle of GUI evolution and behavior of application programs which could have a gradual transition in the GUI representation without simultaneous and significant changes in text and image content, layout for controls, execution time, appearance of new objects and disappearance of old ones, etc. Any changes for search sub phases could be described by algorithms with fuzzy parameters, e.g. a percent bound for size and distance between objects, text content difference, changes in directions between objects, etc. As used herein, soft (or weak) conditions mean wider ranges for some search parameters.

Search subsets could provide parameters and procedures for processing both the recorded image and the current playback image. There may be many parameters for active and additional object detection on the playback image, for example, for size, text and image filtration, and for layout checking, etc. Table IV shows an example simplified version for parameters of search subsets for GUI toolbars.

TABLE IV

| Object detection on the saved (recorded) image | Search the correct hypotheses |
|---|---|
| Set bounds for areas near action point where objects for detection should be considered. | Set coefficients for size and distance filtration. |
| Prefer text objects (set corresponding coefficients for distances)? | Set coefficients for fuzzy text and image filtration. Specific methods could be indicated, e.g. ignoring digits in text. |
| Use size correction to detect best active object? | Set type of layout filtration (fuzzy, vertical, as is etc). |
| Prefer lattice layout (set corresponding coefficients for distances)? | Set coefficients for triangular filtration. |
| Don't use intersected objects? | |
| Set limitations on number of additional objects. | |

Based on application of the Cognitive Control Framework, the most difficult case is a subset(s) for tables, but the Cognitive Control Framework is able to use externally developed modules and users could provide their own tools for semantic analysis and careful data verification. This is an example for specific actions one could configure inside the Cognitive Control Framework. Additionally, it's possible to use self-learning algorithms which form both methods and parameters for the search. Embodiments of the present invention allows for creation of search algorithms.

The system should provide sets of given subsets for effective work in searching hypotheses. There may be five to ten subsets for effective search and identification of wrong conditions in every solution. Users could indicate and load different solutions for content given subsets in accordance with user goals. A brief description for every solution helps users to choose the best alternative, e.g., "Simple search which is stable to text changes in size and small GUI noise in layout" or "Refreshing search which supposes right execution for an application and should find correct hypotheses only," etc.

Figure 28:
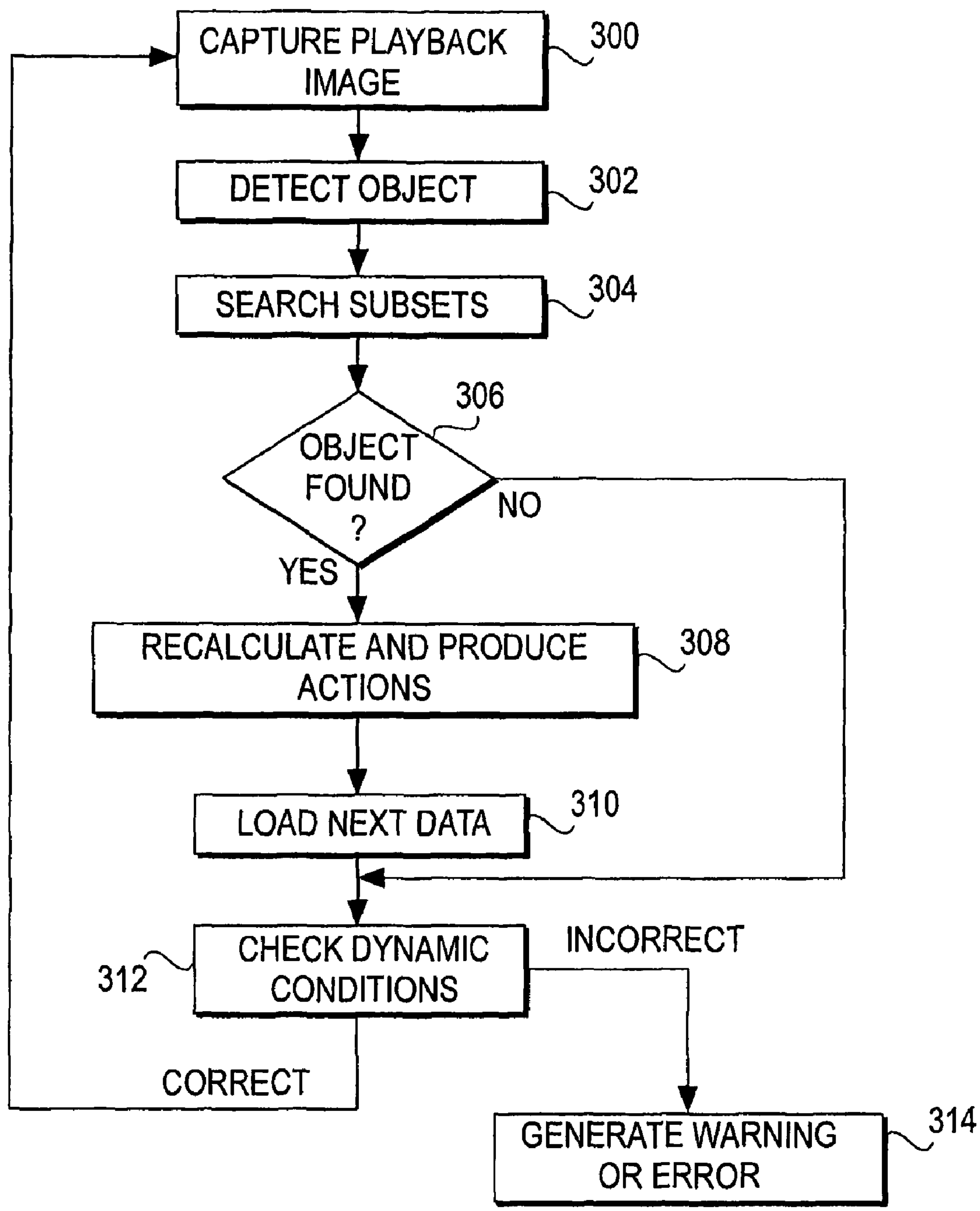
FIG. 28 is a flow diagram illustrating iterative searching of subset of hypotheses during the playback phase according to an embodiment of the present invention.

FIG. 28 presents one method to work with subsets according to an embodiment of the present invention. It is similar to an iterative process for algorithms with different parameters. Alternatively, it could be considered as an iterative procedure to check possible changes on images. At block 300, a current playback image may be captured for subsequent analysis. At block 302, an active object may be detected in the recorded image. At block 304, subsets of hypotheses from the playback image may be searched for an object according to selected predetermined criteria. For example, a first search may be focused on the strict conditions of content and layout. Additionally, the first search may also focus on very strict conditions of size and distance. If the object is found, then processing continues with block 312. Otherwise, further searching may be performed during a second search. For example, a second search may be focused on strict conditions of content and sizes of objects. Additionally, the second search may also focus on the weak conditions of layout and distances. If the object is found, then processing continues with block 312. Otherwise, further searching may be performed during a third search. For example, a third search may be focused on the strict conditions of content and sizes for additional objects, and layout. Additionally, the third search may also focus on very strict conditions of sizes for active objects and distances. The third search may also focus on very weak conditions of searching by content for active objects.

If at any of these steps the object was found, then block 308 may be performed to recalculate old actions for a new object in the playback image by applying the actions according to the execution scenario (as in block 216 of FIG. 2). For example, suppose the user selected (via the mouse) the screen location at (X=70, Y=200), and that a button is displayed at the rectangle denoted (X1=50, Y1=150, X2=100, Y2=100). In the IP, the button may be represented as a rectangle denoted (X1=250, Y1=300, X2=200, Y2=100). For a general view, coordinates of the top left corner and the size of the rectangle may be changed. The mouse click (user selection) may be recalculated based on the position of the button and the scaled size (for X and Y coordinates). The calculation gives the new mouse click coordinates (e.g., X=290, Y=350).

If the object was not found, then processing from block 306 continues at block 312. After the recalculation and production of action steps are performed, the next set of data to be processed may be loaded at block 310. At block 312, dynamic conditions (such as time, for example, although other conditions may also be used) may be checked. If given dynamic conditions are correct, processing continues with the next in a series of playback images at block 300. Otherwise, an error has occurred during search processing and a warning or error message may be generated at block 314.

Figure 29:
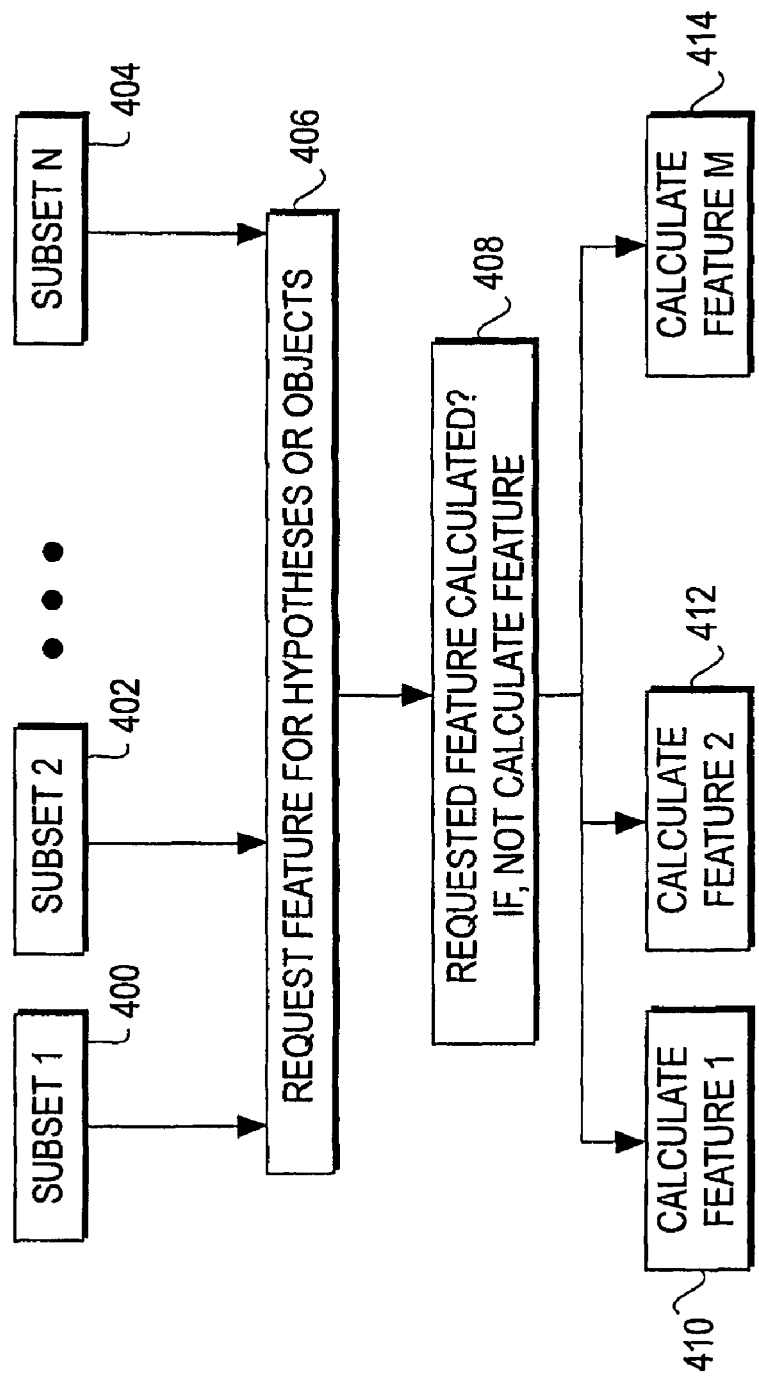
FIG. 29 is a block diagram illustrating a search scheme for working with subsets according to an embodiment of the present invention.

FIG. 29 shows a search scheme for working with subsets of hypotheses. Subsets 400-404 are requested one by one during search procedures via block 406 (abstract layer). Block 408 checks whether some features in requested subsets were calculated before (e.g., some objects (hypotheses) contain the calculated feature). It could take place because many features are useful for different steps in search procedures. In this case we don't need to spend resources to recalculate given features again. Otherwise, features, which weren't calculated before, are requested for calculation in corresponding blocks 410-414.

As described above, ifs important to have a low load on application programs by the testing system. Optical character recognition and image processing could take place on a remote processing system, but search calculation for several subsets is very critical both from data loading and time point perspectives. Significant reductions in computations for searching could take place through the used of ordered subsets and data accumulation. Ordering subsets means that stricter subsets may be searched earlier in the search algorithm. Usually, these subsets provide faster filtration of hypotheses during a first stage of the search subsets step and require searching of fewer objects for heavy calculations. Alternatively, an application has small changes in the most steps. For example, suppose one tries to work with an application twice according to one scenario. Usually one doesn't find a lot of changes in visual representation, perhaps changes occur only in tables only (such as positions of rows). This means we have very similar recording and playback images on many steps, so we don't need complex techniques to find the right hypothesis. By using simpler methods, better performance may be achieved. Embodiment of the present invention allow for fast search results without performance of redundant calculations. A complex search in the case of wrong conditions does not affect the testing principles because the key task here is to inform user about an error, e.g. through a corresponding report and saving of the current playback image for further analysis. In other words, simple steps with small and insignificant changes should require small resources for the search. Analysis of resources could estimate GUI usability and stability. If the CCF uses a small amount of calculation resources to find objects this means it's easy for a human to also find these objects. This correlates well with "easy-to-use" principles.

A data accumulation approach presents any object as a set of characteristics such as size, place on the screen, text content, image structure, etc. Algorithms applied to every subset could require some characteristics for a concrete object (hypotheses). It makes sense to attach given values to an object and, during the next request, to provide the object without recalculation. At present, embodiments of the present invention may be used for results from optical character recognition and image structure filtration (the most computationally intensive methods). Note that characteristics are used for algorithms with fuzzy parameters, e.g. text could be compared (Levenshtein distance) or a result image for structure filtration could be scanned for values in accordance with different bounds.

The present combination of approaches allows for significant reduction of computational load. The present system could be improved by applying new subsets and algorithms inside every subset in accordance with new knowledge and requirements from users. Given solutions may be available in new versions of the Cognitive Control Framework and as separate XML-files for loading into the CCF.

An advantage of embodiments of the present invention is that this method is very flexible to additional improvements based GUI-specific knowledge. A further advantage is that this method provides powerful control for tested GUI application programs. Different sets may be included to verify an application program. Some sets could check the usability of GUI interfaces, e.g. via indication steps where significant differences in sizes, layout, content (e.g. GUI noise) take place at once.

Other advantages are evident. Another advantage of this approach is that it is applicable to any application program exposing a visual interface on any platform and operating system, and is not dependent on a specific API, or architecture of visual system implementation (like Win32 or X-Windows API), or specific operating system. It correlates with an advantage of the overall Cognitive Control Framework approach, which works across platforms. All other known systems are dependent to a small or large extent on system APIs while working with visual elements. A further advantage of this approach is that it is an easy way to significantly decrease the number of hypotheses for active objects. Another advantage is that it is an easy way to help with automatic portability of old scenarios to new versions of products. It decreases the time needed to support a baseline of scenarios for application program testing. Another advantage is that the method does not require significant computing resources compared to other methods. It introduces only minimal disturbance and delay in application execution during playback.

The method of iterative search with data accumulation according to embodiments of the present invention helps to effectively refresh test scenarios. This is especially helpful for easy updating of old tests for new product versions. Easy adaptation for scenarios is extremely useful during GUI updates of software products. The method doesn't require a lot of computing resources because of data accumulation. It's helpful to introduce only minimal disturbance and delay of application execution during playback. It is very flexible to provide additional improvements based on knowledge about specific GUIs. Moreover, it provides powerful control under tested GUI applications. One could include different sets to verify how an application program works. Some sets could check usability of GUI interfaces, e.g. via indication steps where significant differences in sizes, layout, content (e.g. GUI noise) take place at once.

Embodiments of the present invention allows for developers to provide new solutions for users base on specific requirements for a GUI. Additionally, it comprises an easy way to change sets in the Cognitive Control Framework. Users can set up complex search procedures without knowledge about specific details, just from a high-level description, e.g. "Given set controls text size and significant changes in image content both for additional and active objects".

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Although the operations detailed herein may be described as a sequential process, some of the operations may in fact be performed in parallel or concurrently. In addition, in some embodiments the order of the operations may be rearranged without departing from the scope of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A computer-implemented method comprising:

capturing a selected playback image, the playback image being one of a series of display images generated over time by a graphical user interface (GUI) of an application program being tested by a cognitive control framework (CCF) system in a playback phase in response to simulated user inputs to the application program;

detecting at least one active display object in a recorded image, the recorded image being one of a series of display images generated over time by the GUI of the application program being tested and captured during a recording phase of the CCF system based on user inputs to the application program, the user inputs, time interval between user inputs, and resulting display data forming an execution scenario script for use in testing the GUI of the application program during the playback phase for generating playback images, the at least one active display object being a portion of the recorded image being acted upon as a result of user input;

searching subsets of hypotheses of locations of display objects in the captured playback image for a matching display object corresponding to the detected at least one active display object of the recorded image according to predetermined criteria;

recalculating old actions for the matching display object in the playback image by applying actions according to the execution scenario script and loading a next set of data, when the corresponding matching display object is found; and checking dynamic conditions, including the time between user inputs.

2. The method of claim 1, further comprising repeating the capturing, detecting, searching, recalculating, and checking for each of a series of both of the playback and recorded images according to the execution scenario script to automatically test the GUI of the application program.

3. The method of claim 1, wherein searching comprises performing a first search using the predetermined criteria of content and layout of display objects in the GUI of the application program under test.

4. The method of claim 1, wherein searching comprises performing a first search using the predetermined criteria of size and distance of display objects in the GUI of the application program under test.

5. The method of claim 1, wherein searching comprises performing a second search using the predetermined criteria of content and sizes of objects in the GUI of the application program under test.

6. The method of claim 1, wherein searching comprises performing a second search using the predetermined criteria of layout and distances in the GUI of the application program under test.

7. The method of claim 1, wherein searching comprises performing a third search using the predetermined criteria of content and sizes of additional objects, and layout of display objects in the GUI of the application program under test.

8. The method of claim 1, wherein searching comprises performing a third search using the predetermined criteria of sizes of active objects and distances in the GUI of the application program under test.

9. The method of claim 1, wherein searching comprises performing a third search using the predetermined criteria of content for active objects in the GUI of the application program under test.

10. An article comprising: a machine readable medium containing instructions, which when executed, result in searching hypotheses for locations of objects by capturing a selected playback image, the playback image being one of a series of display images generated over time by a graphical user interface (GUI) of an application program being tested by a cognitive control framework (CCF) system in a playback phase in response to simulated user inputs to the application program;

detecting at least one active display object in a recorded image, the recorded image being one of a series of display images generated over time by the GUI of the application program being tested and captured during a recording phase of the CCF system based on user inputs to the application program, the user inputs, time interval between user inputs, and resulting display data forming an execution scenario script for use in testing the GUI of the application program during the playback phase for generating playback images, the at least one active display object being a portion of the recorded image being acted upon as a result of user input;

searching subsets of hypotheses of locations of display objects in the captured playback image for a matching display object corresponding to the detected at least one active display object of the recorded image according to predetermined criteria;

recalculating old actions for the matching display object in the playback image by applying actions according to the execution scenario script and loading a next set of data, when the corresponding matching display object is found; and checking dynamic conditions, including the time between user inputs.

11. The article of claim 10, wherein instructions to search comprise instructions to perform a first search using the predetermined criteria of content and layout of display objects in the GUI of the application program under test.

12. The article of claim 10, wherein instructions to search comprise instructions to perform a first search using the predetermined criteria of size and distance of display objects in the GUI of the application program under test.

13. The article of claim 10, wherein instructions to search comprise instructions to perform a second search using the predetermined criteria of content and sizes of objects of display objects in the GUI of the application program under test.

14. The article of claim 10, wherein instructions to search comprise instructions to perform a second search using the predetermined criteria of layout and distances of display objects in the GUI of the application program under test.

15. The article of claim 10, wherein instructions to search comprise instructions to perform a third search using the predetermined criteria of content and sizes of additional objects, and layout of display objects in the GUI of the application program under test.

16. The article of claim 10, wherein instructions to search comprise instructions to perform a third search using the predetermined criteria of sizes of active objects and distances of display objects in the GUI of the application program under test.

17. The article of claim 10, wherein instructions to search comprise instructions to perform a third search using the predetermined criteria of content for active objects of display objects in the GUI of the application program under test.

18. A cognitive control framework (CCF) system for automatically controlling execution of an application program under test having a graphical user interface comprising:

a recording component adapted to capture user input data and images displayed by the GUI during a recording phase of execution of the application program being tested, and to analyze the captured user input data and displayed images to generate an execution scenario script during the recording phase, and a playback component adapted to perform image analysis on images displayed by the GUI as a result of processing the simulated user input data during a playback phase and captured displayed images from the recording phase, the playback component being adapted to search hypotheses for locations of objects in a playback image corresponding to a recorded image by capturing a selected playback image, the playback image being one of a series of display images generated over time by the GUI of the application program being tested by the CCF system in the playback phase in response to simulated user inputs to the application program;

detecting at least one active display object in the recorded image, the recorded image being one of a series of display images generated over time by the GUI of the application program being tested and captured during a recording phase of the CCF system based on user inputs to the application program, the at least one active display object being a portion of the recorded image being acted upon as a result of user input;

searching subsets of hypotheses of locations of display objects in the captured playback image for a matching display object corresponding to the detected at least one active display object of the recorded image according to predetermined criteria;

recalculating old actions for the matching display object in the playback image by applying actions according to the execution scenario script and loading a next set of data, when the corresponding matching display object is found; and checking dynamic conditions, including the time between user inputs.

19. The system of claim 18, wherein searching comprises performing a first search using the predetermined criteria of content and layout of display objects in the GUI of the application program under test.

20. The system of claim 18, wherein searching comprises performing a first search using the predetermined criteria of size and distance of display objects in the GUI of the application program under test.

21. The system of claim 18, wherein searching comprises performing a second search using the predetermined criteria of content and sizes of objects of display objects in the GUI of the application program under test.

22. The system of claim 18, wherein searching comprises performing a second search using the predetermined criteria of layout and distances of display objects in the GUI of the application program under test.

23. The system of claim 18, wherein searching comprises performing a third search using the predetermined criteria of content and sizes of additional objects, and layout of display objects in the GUI of the application program under test.

24. The system of claim 18, wherein searching comprises performing a third search using the predetermined criteria of sizes of active objects and distances of display objects in the GUI of the application program under test.

25. The system of claim 18, wherein searching comprises performing a third search using the predetermined criteria of content for active objects of display objects in the GUI of the application program under test.

* * * * *